US010218409B2

(12) United States Patent
Poletti et al.

(10) Patent No.: US 10,218,409 B2
(45) Date of Patent: Feb. 26, 2019

(54) SYSTEMS AND METHODS FOR SMALL CELL PLACEMENT USING PNM METRICS

(71) Applicant: CABLE TELEVISION LABORATORIES, INC, Louisville, CO (US)

(72) Inventors: Mark Poletti, Louisville, CO (US); Vaibhav Singh, New Delhi (IN)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 15/951,978

(22) Filed: Apr. 12, 2018

(65) Prior Publication Data

US 2018/0302120 A1     Oct. 18, 2018

Related U.S. Application Data

(60) Provisional application No. 62/484,553, filed on Apr. 12, 2017, provisional application No. 62/484,466, filed on Apr. 12, 2017.

(51) Int. Cl.
| *H04B 3/46* | (2015.01) |
| *H04L 5/02* | (2006.01) |
| *H04L 25/03* | (2006.01) |
| *H04L 27/34* | (2006.01) |
| *H04L 12/28* | (2006.01) |

(52) U.S. Cl.
CPC ............ *H04B 3/46* (2013.01); *H04L 5/02* (2013.01); *H04L 25/03146* (2013.01); *H04L 27/34* (2013.01); *H04L 12/2801* (2013.01)

(58) Field of Classification Search
CPC ....... H04B 3/46; H04L 5/02; H04L 25/03146; H04L 27/34; H04L 12/2801
See application file for complete search history.

(56) References Cited

U.S. PATENT DOCUMENTS

| 2012/0129536 | A1* | 5/2012 | Zou | H04W 52/146 455/444 |
| 2014/0087739 | A1* | 3/2014 | Weaver | H04W 16/18 455/441 |
| 2015/0319710 | A1* | 11/2015 | Rao | H04W 52/244 370/329 |
| 2016/0057638 | A1* | 2/2016 | Zinevich | H04J 11/0023 455/424 |
| 2018/0049180 | A1* | 2/2018 | Lee | H04W 72/0453 |
| 2018/0091988 | A1* | 3/2018 | Chandrasekhar | H04W 24/02 |

* cited by examiner

*Primary Examiner* — Freshteh N Aghdam
(74) *Attorney, Agent, or Firm* — Armstrong Teasdale LLP

(57) ABSTRACT

A communication device is provided for a communication network having a cable plant within an operational vicinity of a macro base station wirelessly transmitting an LTE signal. The communication device includes a processor configured to obtain at least one PNM metric for a cable signal communicated over the cable plant, detect a signature of the LTE signal based on the obtained PNM metric, estimate, based on the detected LTE signature, an existing LTE signal power at a point of leakage in the cable plant, determine a CNR of the cable plant at the point of leakage based on a power of the cable signal and the estimated LTE signal power, and calculate a minimum safe distance from the point of leakage in which a small cell base station may operate without the substantial interference from the LTE signal of the macro base station.

15 Claims, 19 Drawing Sheets

US 10,218,409 B2

SYSTEMS AND METHODS FOR SMALL CELL PLACEMENT USING PNM METRICS

CROSS REFERENCE TO RELATED APPLICATIONS

This application claims the benefit of and priority to U.S. Provisional Patent Application Ser. No. 62/484,553, filed Apr. 12, 2017, and to U.S. Provisional Patent Application Ser. No. 62/484,466, filed Apr. 12, 2017, both of which are incorporated herein by reference in their entireties.

BACKGROUND

The field of the disclosure relates generally to management of wireless communication systems, and more particularly, to placement of wireless small cell communication systems.

Conventional communication systems include wired networks (e.g., cable, fiber optic, hybrid fiber coaxial (HFC), etc.) and wireless technologies (e.g., Wi-Fi, Bluetooth, Zigbee, Long Term Evolution (LTE), etc.). Some HFC networks include Wi-Fi and/or small cell LTE within the communication system of the network. However, transmissions from a mobile macrocell or a macro base station (Macro BS) within the operational vicinity of the HFC network may interfere with the cable television (CATV) signals throughout the network. An illustrative example of such interference is shown below with respect to FIG. 1.

FIG. 1 illustrates a conventional LTE channel plan 100. As illustrated in FIG. 1, LTE channel plan 100 includes an LTE band plan 102, and is superimposed on a CATV sub-band 104. In this example, LTE band plan 102 is shown to include the 700 MHz range, and CATV sub-band 104 is shown to include channel 108 (696-702 MHz) through channel 126 (804-810 MHz). From the example illustrated in FIG. 1, it can be seen how interference occurs when the 700 MHz LTE frequencies ingress the cable plant on CATV channels. Since the 700 MHz modulation is digital, the interference will appear as an increase in the noise floor in the CATV program or data channel. That is, LTE in the 700 MHz range is a major source of interference for the cable signal. This interference may drive error rates beyond a tolerable level, and further cause the collapse of digital programming. In one instance, a multiple-system operator (MSO) was forced to abandon cable channels 116 and 117 due to interference 106 from a wireless LTE mobile network operator (MNO) downlink.

FIG. 2 is a schematic illustration depicting a conventional cable network 200 operating within the vicinity of a macro base station 202. In this example, macro base station 202 represents a transmitting portion of a wireless LTE MNO, and network 200 is an HFC network operable to provide video, voice, and data services to subscribers. Network 200 includes a master headend/hub 204, a node 206, and at least one long fiber or cable 208 (e.g., up to 80 km) connecting headend/hub 204 with node 206. In some examples, headend/hub 204 includes a plurality of headends and/or hubs connected over an optical link (not shown). In this example, headend/hub 204 is in operable communication with at least one satellite earth station/dish 210, the Internet 212, and the public switched telephone network (PSTN) 214. Node 206 connects with a plurality of trunk cables 216 (three shown in this example) that each service a respective service area 218. Each service area 218 may service between 125 and 500 end users 220 (e.g., homes/residences or businesses) that each include at least one cable modem (CM) (not separately shown) connected to a respective trunk cable 216 by one or more drop cables 222.

In operation of network 200, macro base station 202 transmits an LTE signal 224 within the vicinity of a portion 226 of trunk cable 216(1), and thereby introduces interference into the cable signal carried along trunk cable 216(1) that affects all CMs 220 from the point of interference or leakage (i.e., portion 226) onwards (e.g., service area 218 (1)). This LTE interference poses an additional problem with respect to inclusion of a small cell base station 228 within the service area 218(1) as another type of end user. Small cell base station 228 is considered "small" with respect to macro base station 202 because small cell base station 228 generally includes a low-powered cellular radio access node having a range of 10 meters to a few kilometers, which is a considerably shorter range than that of macro base station 202, and will also typically handle fewer concurrent calls or sessions. Conventional techniques rendered difficult to determine whether placement of small cell base station 228 at the desired location is operationally safe. Furthermore, conventional techniques do not easily detect if LTE interference is present in the given cable plant, nor do they enable the station operator to estimate a safe distance of small cell base station 228 from ingress-affected CMs 220.

Conventional small cell placement techniques utilize a drive test to assess interference and determine optimum small cell placement. Requiring the drive test for the placement of every small cell base station, however, is a significantly expensive assessment cost, and requires considerable human and equipment resources. Accordingly, it is desirable to be able to determine optimum small cell placement using existing technology already in use in the field.

BRIEF SUMMARY

In an embodiment, a communication device is provided in a communication network having at least one cable plant within an operational vicinity of a macro base station wirelessly transmitting a long term evolution (LTE) signal. The communication device includes at least one processor configured to obtain at least one proactive network maintenance (PNM) metric for a cable signal communicated over the at least one cable plant, detect, at the communication device, a signature of the LTE signal based on the obtained PNM metric, estimate, based on the detected LTE signature, an existing LTE signal power at a point of leakage in the at least one cable plant, determine a carrier to noise ratio (CNR) of the at least one cable plant at the point of leakage based on a power of the cable signal and the estimated LTE signal power, and calculate a minimum safe distance from the point of leakage in which a small cell base station may operate without the substantial interference from the LTE signal of the macro base station.

In an embodiment, a method provided for determining a small cell base station placement in a communication network operating within the vicinity of a macro base station wirelessly transmitting a long term evolution (LTE) signal. The method includes steps of obtaining one proactive network maintenance (PNM) metric for each of a plurality of cable modems disposed within the coverage area of the small cell base station, identifying, from the obtained PNM metrics, a selected number of the plurality of cable modems exhibiting an ingress signature of the LTE signal, mapping respective locations of the identified selected number of cable modems, determining, from the mapped respective locations, likely ingress points of interference from the LTE signal along a cable plant infrastructure of the communication network, and calculating a minimum safe operating distance, from at least one determine the likely ingress point, for the small cell base station.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
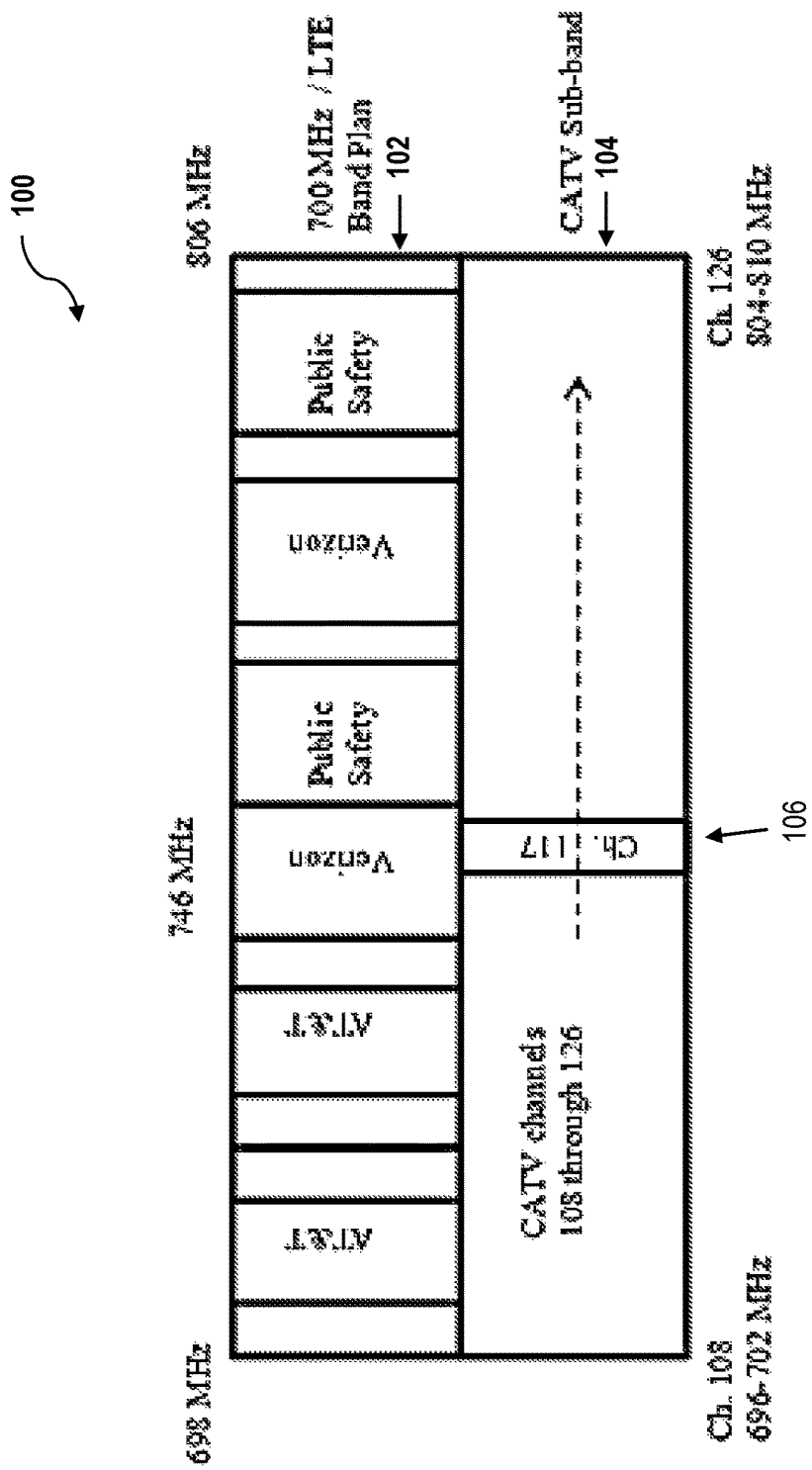
FIG. 1 illustrates a conventional LTE channel plan.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As described herein, the phrase "user equipment" includes an electronic device or system utilizing an aggressive, non-cooperative technology protocol, such as LTE or LTE-U. The phrase "Wi-Fi device" includes an electronic device, such as a station or STA, that has the capability to use one of the existing 802.11 protocols. For example, a Wi-Fi device can include, without limitation, one or more of a laptop, a desktop personal computer (PC), personal digital assistant (PDA), AP, and a Wi-Fi phone/smartphone. The Wi-Fi device may be fixed, mobile, or portable, and includes a transceiver or transmitter/receiver combination, an 802.11-conformant media access control (MAC) and physical layer (PHY) interface to a wireless medium (WM).

The following description features processes and systems for utilizing existing communication network technology to detect and characterize a downlink LTE ingress using proactive network maintenance (PNM) metrics. The present embodiments relate to management of cable networks in the presence of interfering wireless ingresses within the coverage area. The techniques described herein may also be advantageously implemented to detect and/or monitor egress of bandwidths in the LTE spectrum. As described in greater detail further below, the present embodiments implement innovative algorithms are capable of utilizing one or more of multiple management information bases (MIBs) to detect the LTE signal and the LTE ingress, and also to characterize the LTE power level in the cable using an LTE signature at the cable modem. An exemplary embodiment, the present embodiments utilize the conventional hardware architecture of network 200, FIG. 2, described above, and implement innovative programming algorithms into a processor (not separately shown) of the headend/hub or CM.

In the exemplary embodiment, each of the foregoing detection and characterization techniques may be implemented individually, or in combination with one or more of the other techniques described herein. In some embodiments, these several techniques may be implemented simultaneously, in succession, or in reverse order. These advantageous detection and characterization techniques are described further below with respect to the several drawings.

In the exemplary embodiment, LTE ingress may be detected according to techniques including, without limitation, (i) truck rolls to capture leakage from the cable plant, and/or (ii) detection of one or more PNM MIBs. The following embodiments are described with respect to the latter technique, namely, PNM MIB detection, due to its advantage in cost reduction with respect to truck roll techniques. Other on-site leakage detection schemes are known in the field, but do not provide distinct advantages of the innovative techniques described herein using PNM MIBs to detect and characterize LTE ingress.

The following exemplary embodiments for characterizing the downlink LTE ingress interference into the cable plant is described with respect to several sub-parts: (A) utilization of PNM metrics to detect the ingress into the cable plant; (B) identification of the LTE ingress signature; and (C) determination of respective thresholds of the PNM through, for example, lab tests and testing systems. In some embodiments, joint algorithms are implemented to detect LTE using multiple PNM MIBs.

Figure 3:
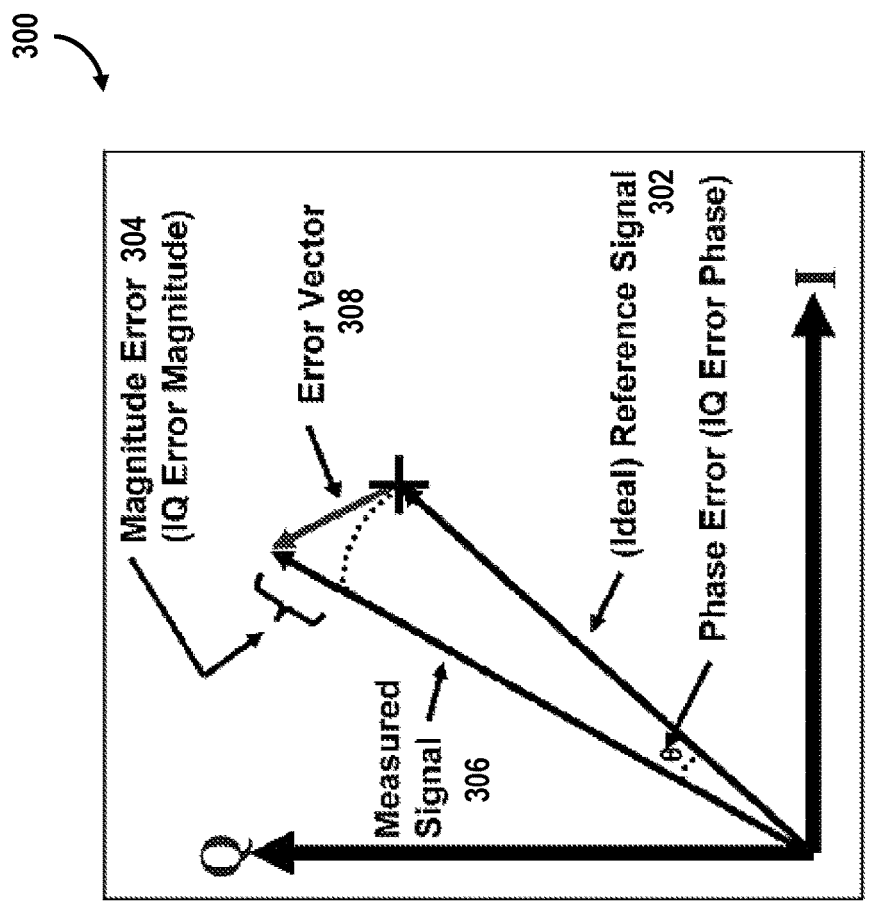
FIG. 3 is a graphical illustration depicting a modulation error ratio calculation for LTE ingress detection, according to an embodiment.

FIG. 3 is a graphical illustration depicting a modulation error ratio (MER) calculation 300, implemented for LTE ingress detection. The MER represents the ratio of average symbol power to average slicer error power, expressed in dB, and is a direct measurement of the modulation quality of a digital signal, and thus of particular use in determining the quality of a radio frequency (RF) and quadrature amplitude modulation (QAM) signal. With respect to calculation 300, the input and output of the slicer (not shown) are complex numbers or vectors, each represented by two components: magnitude and phase, or equivalently, real (in-phase or "I", horizontal axis) and imaginary (quadrature or "Q", vertical axis) parts, as shown in FIG. 3.

In an ideal, zero-noise, zero-ISI condition, which is depicted in FIG. 3 as ideal reference signal vector 302, the soft decision would lie exactly on one of the constellation points, and a magnitude error 304 thereof would be zero. In a real-world receiver though, subtracting the hard-decision vector 302 from a soft-decision vector 306 of the measured signal provides the error/noise vector 308 at each symbol time. For calculation 300, it is presumed that a low symbol error rate exists, that is, few decisions will be incorrect. For the received MER (RxMER), average power of the error vector is a concern, and may be further computed by taking the complex magnitude-squared of error vector 308 and averaging this value over a given number of symbols N, thereby providing the error vector power (or noise power) at the slicer. To obtain the ratio of signal to noise (SNR), the average signal power, which should be a known constant for each constellation (e.g., 64-QAM or 256-QAM), is divided by the average error vector power, with the results converted logarithmically to dB to obtain the RxMER.

As illustrated in FIG. 3, each vector has a real and imaginary component, and a high RxMER will result in a clean constellation plot, where each symbol point exhibits a tight cluster separated from the neighboring symbols. According to this MER calculation 300, the effect of an LTE signal ingressing into the cable plant can be determined because the effect of the LTE ingress will decrease the MER.

Figure 4:
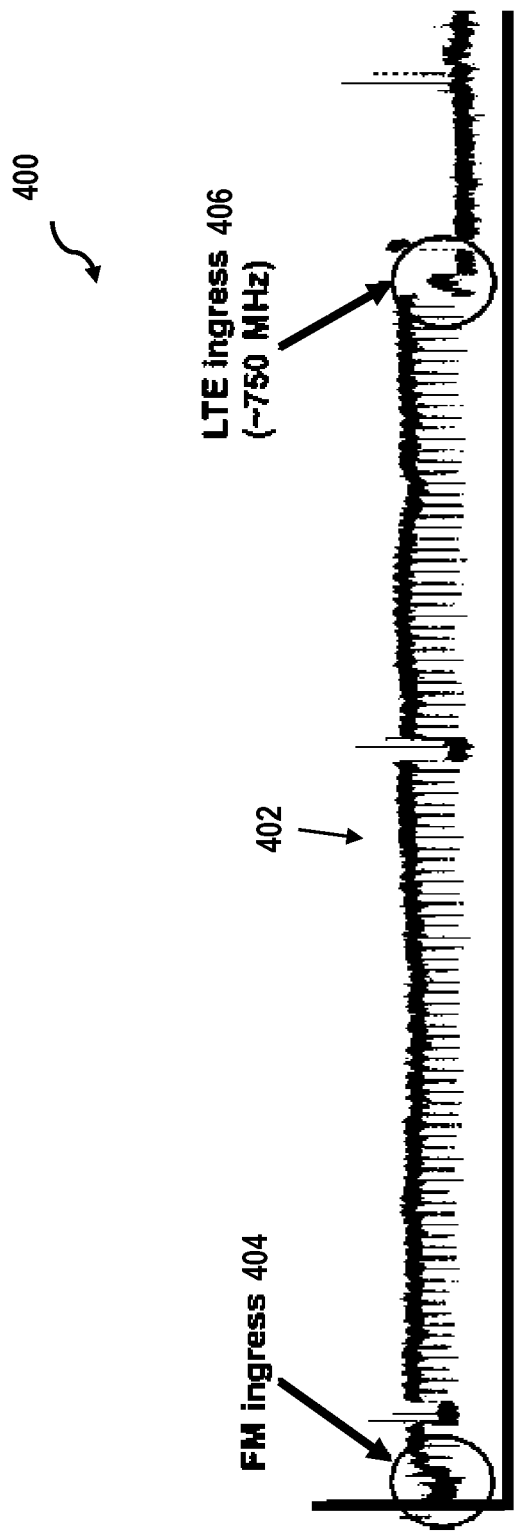
FIG. 4 is a graphical illustration depicting a full band capture measurement for LTE ingress detection, according to an embodiment.

FIG. 4 is a graphical illustration depicting a full band capture (FBC) measurement 400, implemented for LTE ingress detection. FBC generally utilizes a discrete Fourier transform (DFT) and/or a fast Fourier transform (FFT) to support spectrum analyzer-like functionality in customer premises equipment such as CMs. In the exemplary embodiment, the CM (not shown in FIG. 4) captures spectrum data 402 using, for example, a simple network management protocol (SNMP) or the like. According to measurement 400, the FBC capture of spectrum data 402 enables the cable operator to view where ingress or other impairments might be problematic. FIG. 4 illustrates a visible FM ingress 404 and a visible LTE ingress 406 on spectrum data 402.

More particularly, measurement 400 provides the absolute value(s) of spectrum data at the particular CM. Measurement 400 is also of particular use to determine the effect of an LTE signal ingressing into the cable plant, because the LTE ingress will (i) raise the noise floor for DOCSIS QAM non-occupied channels, and (ii) raise the signal level for DOCSIS QAM occupied channels. In some embodiments, where a sufficient number of FBC-capable CMs are available in one or more service areas, measurement 400 may further allow the cable operator to approximately isolate the area of the cable plant where the ingress enters the network (e.g., portion 226, FIG. 2).

Figure 5:
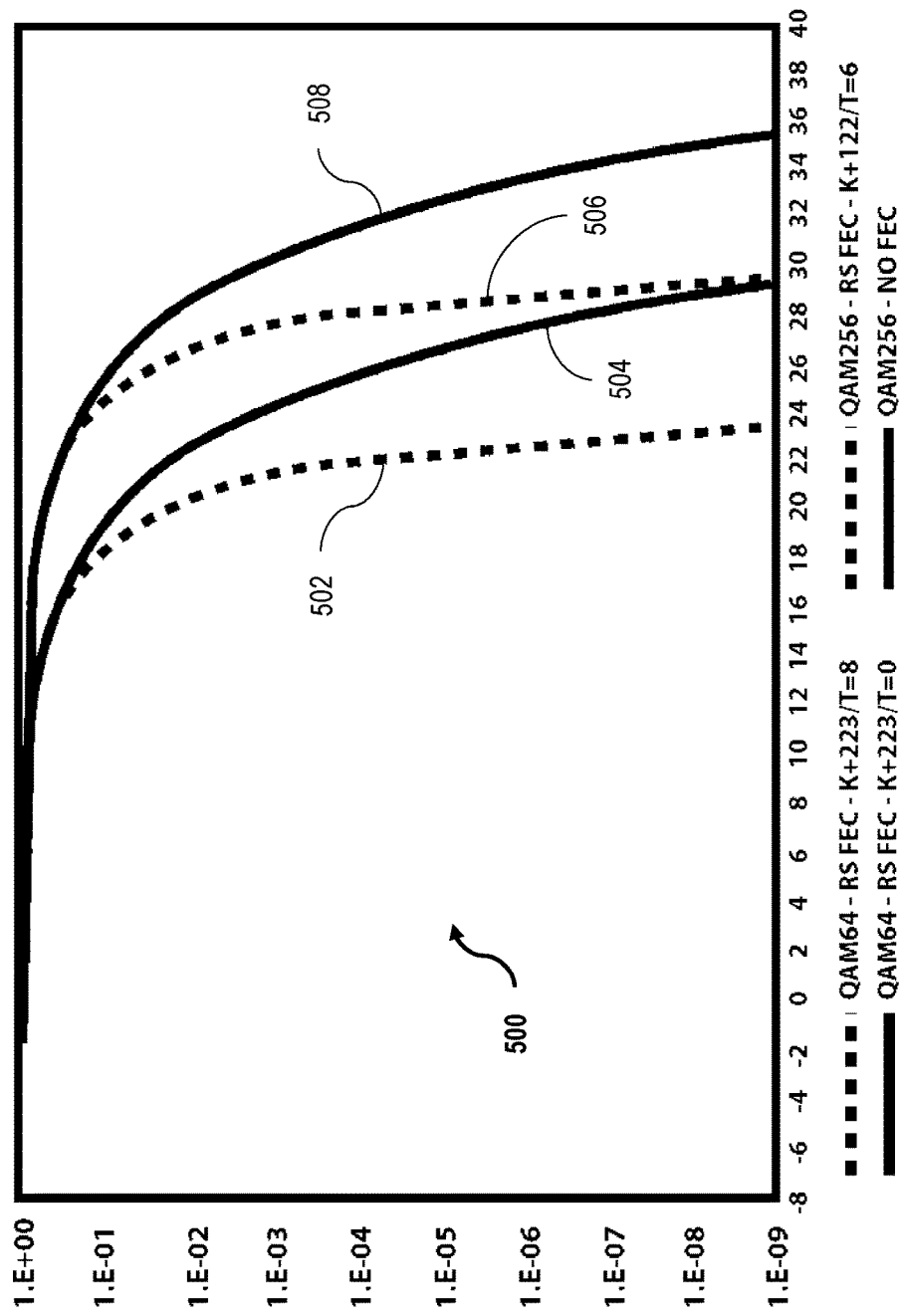
FIG. 5 is a graphical illustration depicting a forward error correction calculation for LTE ingress detection, according to an embodiment.

FIG. 5 is a graphical illustration depicting a forward error correction (FEC) calculation 500, implemented for LTE ingress detection. Calculation 500 utilizes the bit error rate (BER) PNM metric for given orders of modulation, and also as an indicator of the quality of the cable/HFC network. In the exemplary embodiment illustrated in FIG. 5, calculation 500 implements Reed-Solomon (RS) FEC as an adaptive equalization technique to mitigate the effects of the ingress into the cable plant. The RS-FEC may be implemented by a processor of the CM, or by a processor in a cable modem termination system (CMTS) of the headend/hub. Calculation 500 is determined in this example with respect to a QAM64 signal 502 implementing RS-FEC having a code dimension K of 223 and T=8, a QAM64 signal 504 implementing RS-FEC with K of 223 and T=0, a QAM256 signal 506 implementing RS-FEC with K of 122 and T=6, and a QAM256 signal 508 does not implement RS-FEC. The particular modulation and coding schemes illustrated in FIG. 5 are provided for purposes of illustration, and are not intended to be limiting.

According to the exemplary embodiment depicted in FIG. 5, calculation 500 provides a codeword error rate (CER) and a post-FEC error rate. These metrics provide the percentage of un-corrected (errors) codewords in the downlink, and are further useful to determine the effect of the LTE signal ingressing into the cable plant because the ingressing LTE will increase the percentage of errored codewords. In the exemplary embodiment, CER is defined according to the equation:

$$CER = \frac{\text{Uncorrected}}{\text{Uncorrected} + \text{Corrected} + \text{Unerrored}} \quad \text{(Eq. 1)}$$

Figure 6:
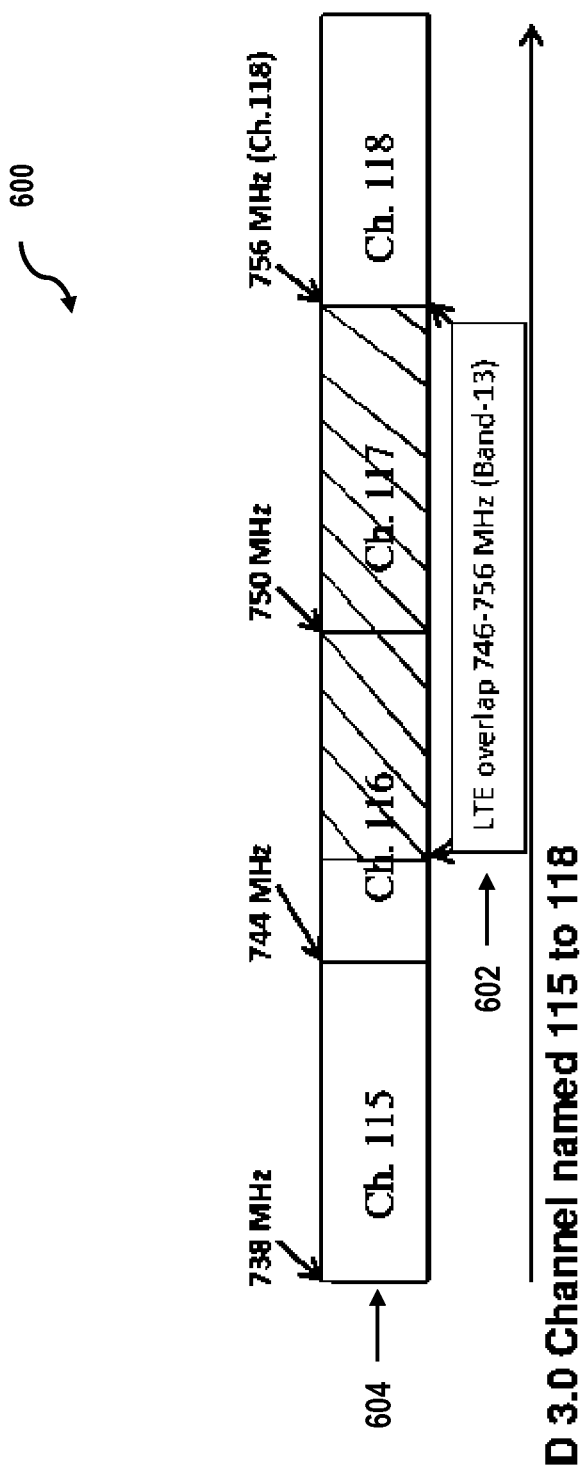
FIG. 6 is a schematic illustration depicting a channel overlap effect, according to an embodiment.

FIG. 6 is a schematic illustration depicting a channel overlap effect 600 of an LTE band 602 with a DOCSIS 3.0 channel 604. In the example illustrated in FIG. 6, LTE band 602 is depicted as downlink Band-13 occupying 10 MHz (746-756 MHz), and DOCSIS 3.0 channel 604 is depicted as including cable channels 115 (738-744 MHz), 116 (744-750 MHz), 117 (750-756 MHz), and 118 (756 MHz-762 MHz), which collectively occupy 24 MHz. The LTE/DOCSIS bandwidth ratio is therefore 1.66:4 in this embodiment. These examples are provided for purposes of illustration, and are not intended to be limiting.

As shown in FIG. 6, channel overlap effect 600 illustrates the partial (i.e., Ch. 116) or full (i.e., Ch. 117) overlap of LTE downlink Band-13 602 with cable channels 116 and 117. In the exemplary embodiment, the MIBs of QAM-occupied DOCSIS channel 604 having Band-13 interference are comparatively evaluated to identify the LTE signature of LTE band 602. More particularly, the MIBs of channels that do not experience LTE overlap (i.e., channels 115 and 118 in this example) are used to compare with the MIBs of channels having full or partial overlap (i.e., channels 116 and 117) to distinguish the LTE signature of the interfering signal according to the effect on the adjacent channels.

Figure 7:
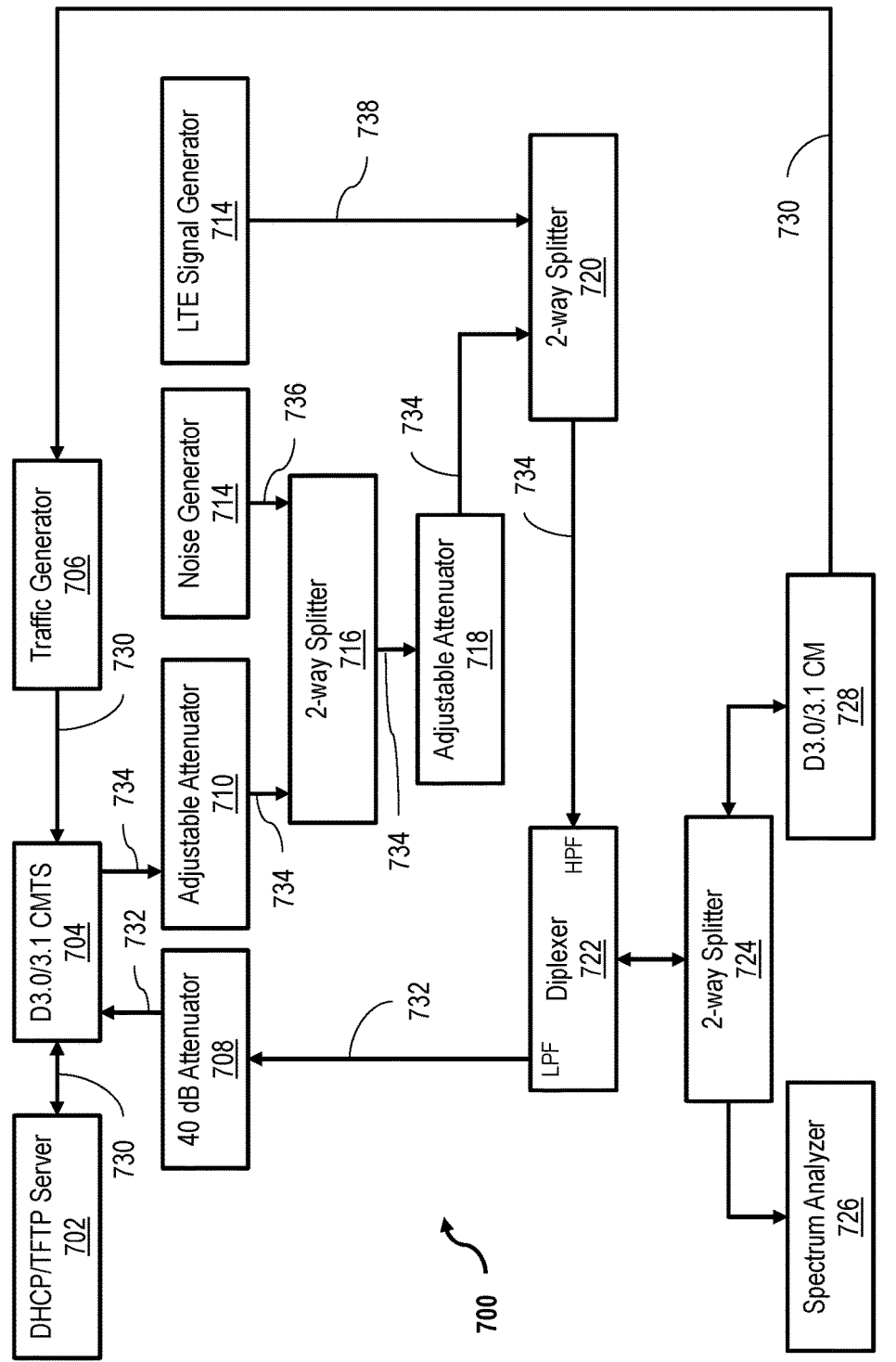
FIG. 7 is a schematic block diagram of an exemplary LTE detection test system, according to an embodiment.

FIG. 7 is a schematic block diagram of an exemplary LTE detection test system 700. Test system 700 is configured to introduce a repeatable control LTE signal into a network simulation to verify the concept of the innovative LTE detection and characterization techniques described herein.

In the exemplary embodiment, test system includes a dynamic host configuration protocol (DHCP)/trivial file transfer protocol (TFTP) server 702, a DOCSIS 3.0/DOCSIS 3.1 CMTS 704, a traffic generator 706, a 40 dB attenuator 708, a first adjustable attenuator 710, a noise generator 712, an LTE signal generator 714, a first two-way splitter 716, a second adjustable attenuator 718, a second two-way splitter 720, a diplexer 722, a third two-way splitter 724, a spectrum analyzer 726, and a DOCSIS 3.0/DOCSIS 3.1 CM 728.

In exemplary operation of the test system 700, indication (i) between DHCP/TFTP server 702 and CMTS 704, (ii) from traffic generator 706 to CMTS 704, and (iii) from CM 728 to traffic generator 706 occurs over an ethernet link 730. Also in exemplary operation, communication (i) from diplexer 722 (e.g., from a lowpass filter (LPF) thereof, not separately numbered) to 40 dB attenuator 708, and (ii) from 40 dB attenuator 708 to CMTS 704 occurs over an upstream-only link 732. Similarly, communication (i) from CMTS 704 to first adjustable attenuator 710, (ii) from first adjustable attenuator 710 to first two-way splitter 716, (iii) from first two-way splitter 716 to second adjustable attenuator 718, (iv) from second adjustable attenuator 718 to second two-way splitter 720, and (v) from second two-way splitter 720 to diplexer 722 occurs over a downstream-only link 734. In this example, introduction of noise from noise generator 712 to first two-way splitter 716 may occur over a first cable 736, and introduction of an LTE signal from LTE signal generator 714 to second two-way splitter 720 may occur over a second cable 738.

In at least one embodiment, LTE signal generator 714 is a R&S SMV 100A vector signal generator which operates to generate an LTE additive signal to the sum of a cable signal (e.g., from CMTS 704 and first adjustable attenuator 710) and noise generated by noise generator 712. As described further below, the signal strength of the LTE signal his varied, and the respective LTE signature is identified using different MIBs. Tables 1-10, below, illustrate that multiple test trials verify the repeatability of the innovative concepts described herein. The multiple test trials are further considered with respect to both a case of high CM of power (Case 1) and low CM power (Case 2).

More specifically, Tables 1-10 provide proof of concept by controlling several test parameters for both Case 1 and Case 2, with each test case and MIB evaluated for five different LTE signal power values with respect to the cable signal power. In the exemplary embodiment, The power received by CM 728 in Case 1 was 12.4 dBmV, which represents a CM in favorable cable power conditions, whereas the power received by CM 728 in Case 2 was −0.5 dBmV, which represents a CM in non-favorable power conditions. The SNR for all 10 tests was held to 33 dB (e.g., 256 QAM). The signal to noise power is therefore represented as the cable signal power with respect to the white noise power.

The LTE signal from LTE signal generator 714 was then added to the signal and white noise combination according to five different LTE signal power values: (1)−38 dB (Low); (2)−35 dB (Low); (3)−33 dB (Medium); (4)−30 dB (Medium); and (5)−27 dB (High). The set of respective MIBs more than measured for 15-minute test intervals, and five trials of the tests were run to confirm the repeatability of the detection of the LTE signature for both Cases 1 and 2. For the Tables shown below, the MIBs were sampled every 6 seconds for 15 minutes each to capture variation of the respective MIB with respect to time, and further to provide a large number of samples to capture the sensitivity of the different MIBs.

Modulation Error Ratio Management Information Base (MER MIB)

As described above with respect to FIG. 6, the LTE overlapped channel MER for DOCSIS 3.0 channel 116 (representing a partial overlap) and DOCSIS 3.0 channel 117 (representing a full overlap) can be measured to determine the LTE signature. In the test results shown below with respect to Tables 1 and 2, the MER of DOCSIS 3.0 Channel 118 was used as reference for both the full and partial overlap, since channel 118 was not affected by the LTE overlap/ingress. The difference of the MER values between channels 116 and 118 therefore demonstrates the effect of the LTE signature for a partial overlap, whereas the difference of MER values between channels 117 and 118 demonstrates the effect of the LTE signature for a full overlap.

As shown below, Table 1 shows the difference in MER values for channels 117 and 118 across five different LTE signal power test runs for Case 1. Because the standard deviation of the measured difference in MER across the different trials is low, the LTE signature is considered reliably repeatable. Furthermore, the measured MER difference is shown to be very close to the expected MER difference (where LTE signal is modeled as additive white Gaussian noise (AWGN) for the expected MER calculation).

Similarly, Table 2 shows the difference in MER values for channels 117 and 118 in Case 2, across the same five different LTE signal powers that were run for Case 1. The standard deviation of the measured difference of MER across the different trials was also low, and thus the signature is considered repeatable as in Case 1. Also similar to Case 1, the measured MER difference is very close to the expected MER difference (LTE signal again modeled as AWGN for the expected MER calculation).

TABLE 1

Case 1 (CM Power = 12 dBmV)
Difference of MER of channel 117 (full LTE overlap) and channel 118

| LTE signal power | Measured difference of MER Trial1 | Measured difference of MER Trial2 | Measured difference of MER Trial3 | Measured difference of MER Trial4 | Measured difference of MER Trial5 | Standard Deviation | Mean difference of MER | Expected difference of MER |
|---|---|---|---|---|---|---|---|---|
| −38 dB | 1.18 | 1.13 | 1.14 | 1.15 | 1.14 | 0.02 (1.7%) | 1.15 | 1.19 |
| −35 dB | 2.04 | 2.03 | 2.03 | 2.02 | 2.01 | 0.011 (0.5%) | 2.03 | 2.13 |

TABLE 1-continued

Case 1 (CM Power = 12 dBmV)
Difference of MER of channel 117 (full LTE overlap) and channel 118

| LTE signal power | Measured difference of MER Trial1 | Measured difference of MER Trial2 | Measured difference of MER Trial3 | Measured difference of MER Trial4 | Measured difference of MER Trial5 | Standard Deviation | Mean difference of MER | Expected difference of MER |
|---|---|---|---|---|---|---|---|---|
| −33 dB | 2.98 | 2.97 | 2.96 | 2.96 | 2.97 | 0.008 (0.2%) | 2.97 | 3.02 |
| −30 dB | 4.74 | 4.73 | 4.73 | 4.73 | 4.72 | 0.0071 (0.15%) | 4.73 | 4.77 |
| −27 dB | 6.81 | 6.79 | 6.78 | 6.82 | 6.82 | 0.018 (0.2%) | 6.80 | 6.98 |

TABLE 2

Case 2 (CM Power = 0 dBmV)
Difference of MER of channel 117 (full LTE overlap) and channel 118

| LTE signal power | Measured difference of MER Trial1 | Measured difference of MER Trial2 | Measured difference of MER Trial3 | Measured difference of MER Trial4 | Measured difference of MER Trial5 | Standard Deviation | Mean difference of MER | Expected difference of MER |
|---|---|---|---|---|---|---|---|---|
| −38 dB | 1.02 | 1.02 | 1.01 | 1.02 | 1.02 | 0.0045 | 1.02 | 1.19 |
| −35 dB | 1.92 | 1.9 | 1.94 | 1.94 | 1.92 | 0.016 | 1.92 | 2.13 |
| −33 dB | 2.81 | 2.86 | 2.82 | 2.80 | 2.8 | 0.025 | 2.82 | 3.02 |
| −30 dB | 4.48 | 4.48 | 4.49 | 4.49 | 4.5 | 0.008 | 4.48 | 4.77 |
| −27 dB | 6.57 | 6.57 | 6.57 | 6.58 | 6.58 | 0.005 | 6.57 | 6.98 |

Figure 8:
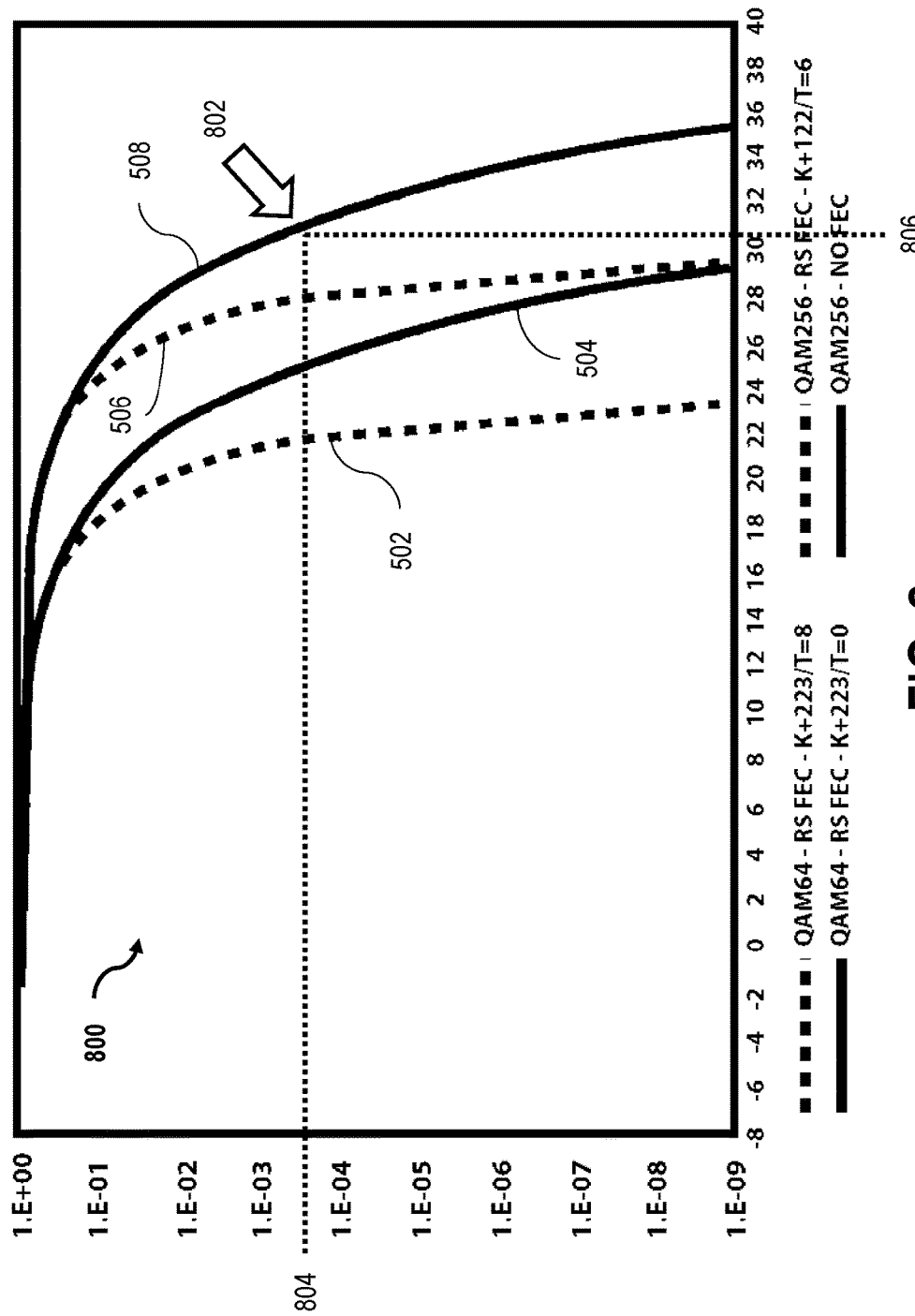
FIG. 8 is a graphical illustration of a threshold effect on the calculation depicted in FIG. 5, according to an embodiment.

FIG. 8 is a graphical illustration of a threshold effect 800 on calculation 500, FIG. 5. In the exemplary embodiment, based on the test results shown above in Tables 1 and 2, a threshold of 1 dB, which represents the MER difference between the measured channels with and without LTE interference, is utilized to detect a low strength LTE signal (i.e., relative to the strength of the cable signal). More specifically, threshold effect 800 is of particular use in determining whether the interfering LTE signal it is affecting the quality of service (QoS) of the cable plant.

In exemplary operation of threshold effect 800, a threshold MER/SNR intersection 802 may be identified from the receiver characteristic of the CM (i.e., dependent on the chipset vendor), and based on the particular QoS desired by the MSO cable operator. Threshold MER/SNR intersection 802 indicates the point on a particular signal (QAM256 signal 508 in this example) corresponding to the crossing of MER value 804 and SNR value 806. Using threshold MER/SNR intersection 802, a maximum allowable MER difference, Δ(dB), between the channel affected by the LTE overlap and the channel not affected by the LTE overlap may be calculated according to:

$$\Delta(dB) = MER_{channel\ not\ affected\ by\ LTE} - MER_{channel\ affected\ by\ LTE} \quad (Eq.\ 2)$$

where $$\Delta = 10*\log 10(P1+P2) - 10*\log 10(P1) \quad (Eq.\ 3)$$

and where P1 represents the noise power in the plant with respect to the cable signal power, and where P2 represents the LTE signal power with respect to the cable signal power.

Power P2 may then be approximately estimated according to the following equation:

$$P2(dB) = 10*\log 10\left(\left(10^{\frac{\Delta+\epsilon+10*\log 10(P1)}{10}}\right) - P1\right) \quad (Eq.\ 4)$$

where ∈ (dB) represents slack to incorporate error in modeling the LTE signal as white noise. As described further below, FBC embodiments may utilize a similar. As addressed in a co-pending application to the same inventors, the P2 power calculation may also be useful to estimate a minimum distance of a small cell base station (e.g., small cell base station 228, FIG. 2) from the cable plant.

Furthermore, for different threshold values in threshold effect 800, the LTE signature may be further utilized to map to the LTE signal strength (with respect to the cable signal strength) to the MER signature. This mapping is particularly useful, for example, in order to calculate the approximate worst case distance of the LTE source from the leakage. Table 3, below, demonstrates how the difference of the respective MER signature is mapped to the relevant LTE signal strength.

TABLE 3

Mapping the MER signature to LTE signal strength

| Difference of MER signature | LTE signal strength |
|---|---|
| >1 dB and <2 dB | Low |
| >2 dB and <5 dB | Medium |
| >5 dB | High |

Table 4, below, represents the respective MER difference between channels 116 and 118 across the different test runs, described above, for Case 1. Table 5, below, represents the respective MER difference between channels 116 and 118 across same test runs, but for Case 2. In both Tables 4 and 5 the standard deviation of the measured MER difference across the different trials is shown to be low, and therefore the signature is repeatable. Furthermore, similar to the test results described above, the measured MER difference is shown to be close to the expected MER difference.

TABLE 4

Case 1 (CM Power = 12 dBmV):
Difference of MER of channel 116 (Partial LTE overlap) and channel 118

| LTE signal power | Measured difference of MER Trial1 | Measured difference of MER Trial2 | Measured difference of MER Trial3 | Measured difference of MER Trial4 | Measured difference of MER Trial5 | Standard deviation | Mean difference of MER | Expected difference of MER |
|---|---|---|---|---|---|---|---|---|
| −38 dB | 0.53 | 0.53 | 0.51 | 0.53 | 0.53 | 0.009 | 0.53 | 0.82 |
| −35 dB | 1.15 | 1.15 | 1.16 | 1.15 | 1.15 | 0.0045 | 1.15 | 1.51 |
| −33 dB | 1.88 | 1.88 | 1.87 | 1.87 | 1.87 | 0.005 | 1.87 | 2.2 |
| −30 dB | 3.19 | 3.16 | 3.17 | 3.16 | 3.17 | 0.012 | 3.17 | 3.64 |
| −27 dB | 4.72 | 4.85 | 4.85 | 4.84 | 4.84 | .056 | 4.82 | 5.59 |

TABLE 5

Case 2 (CM Power = 0 dBmV)
Difference of MER of channel 116 (Partial LTE overlap) and channel 118

| LTE signal power | Measured difference of MER Trial1 | Measured difference of MER Trial2 | Measured difference of MER Trial3 | Measured difference of MER Trial4 | Measured difference of MER Trial5 | Standard deviation | Mean difference of MER | Expected difference of MER |
|---|---|---|---|---|---|---|---|---|
| −38 dB | 0.43 | 0.43 | 0.43 | 0.42 | 0.43 | 0.0045 | 0.43 | 0.82 |
| −35 dB | 1.09 | 1.07 | 1.08 | 1.17 | 1.08 | 0.04 | 1.10 | 1.51 |
| −33 dB | 1.72 | 1.72 | 1.74 | 1.72 | 1.73 | 0.009 | 1.72 | 2.20 |
| −30 dB | 3.00 | 2.98 | 2.99 | 3.00 | 3.01 | 0.01 | 2.99 | 3.64 |
| −27 dB | 4.61 | 4.63 | 4.62 | 4.62 | 4.63 | .008 | 4.62 | 5.59 |

Figures 9A, 9B:
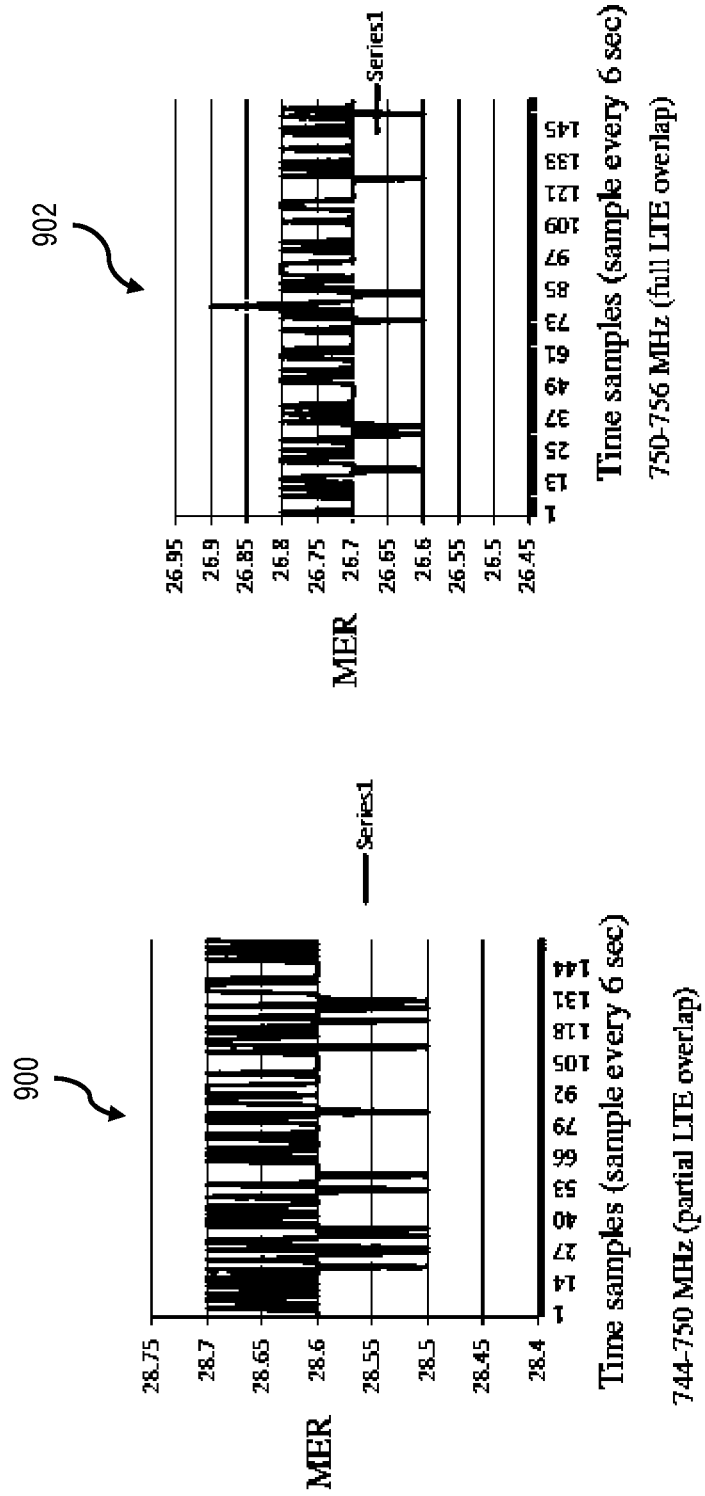
FIGS. 9A-B are graphical illustrations demonstrating modulation error ratio variation over time, according to an embodiment.

FIGS. 9A and 9B are graphical plots 900 and 902, respectively, illustrating MER variation over time. As described above, in the exemplary embodiment, time samples are obtained every six seconds (e.g., by test system 700, FIG. 7). More particularly, plot 900 illustrates the MER variation over time in the case of partial LTE overlap, i.e., with channel 116, and plot 902 illustrates the MER variation over time in the case of full LTE overlap, i.e., with channel 117. The relatively low variation of MER over time, as shown in plot 900 and 902 demonstrates the relatively high repeatability described above.

Figure 10:
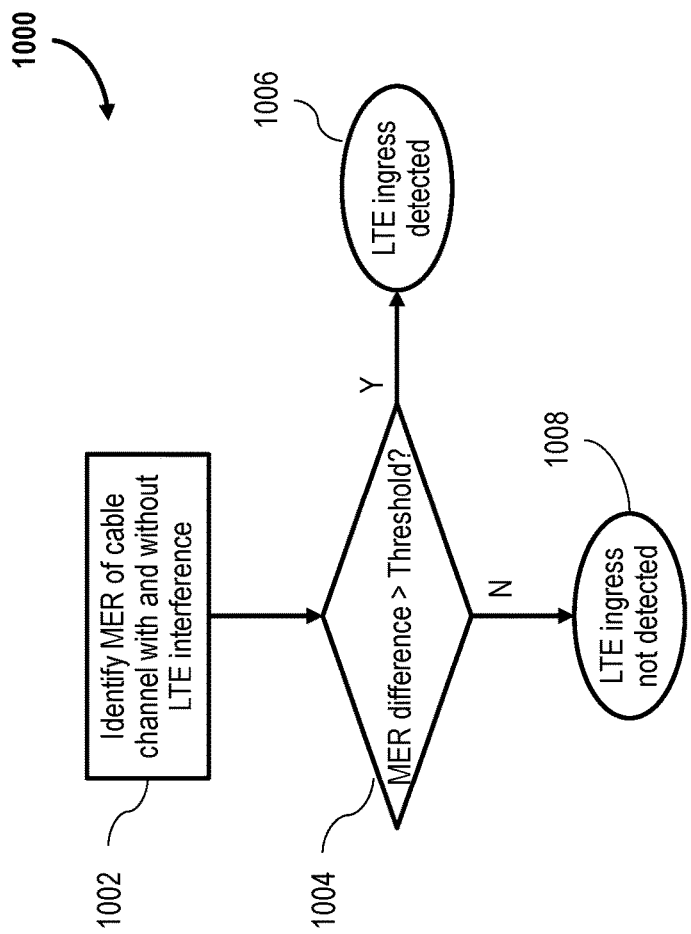
FIG. 10 is a flow chart diagram of an exemplary ingress detection process utilizing modulation error ratio, according to an embodiment.

FIG. 10 is a flow chart diagram of an exemplary ingress detection process 1000 utilizing MER. In the exemplary embodiment, process 1000 is executed by one or both of the processors of the CM or CMTS. Process 1000 may, for example, include computer-executable instructions for the respective processor, or may alternatively be executed by a dedicated hardware unit.

In exemplary operation, process 1000 begins at step 1002. In step 1002, process 1000 identifies the respective MERs of the cable channel having LTE interference (e.g., channels 116 or 117) and the cable channel without LTE interference (e.g., channels 115 or 118). Step 1004 is a decision step. In step 1004, process 1000 determines whether the difference between the respective MERs of the cable channel having LTE interference and the cable channel without LTE interference exceeds a threshold value (e.g., threshold effect 800, FIG. 8). As described above with respect to FIG. 8, this threshold value for the MER difference may be based, at least in part, on the QoS desired by the MSO. If, in step 1004, process 1000 determines that the MER difference is greater than the threshold value, process 1000 proceeds to step 1006, where process 1000 determines that an LTE ingress is detected. If, however, in step 1004, process 1000 determines that the MER difference is not greater than the threshold value, process 1000 proceeds to step 1008, where process 1000 determines that an LTE ingress is not detected. Full Band Capture Management Information Base (FBC MIB)

Figure 11:
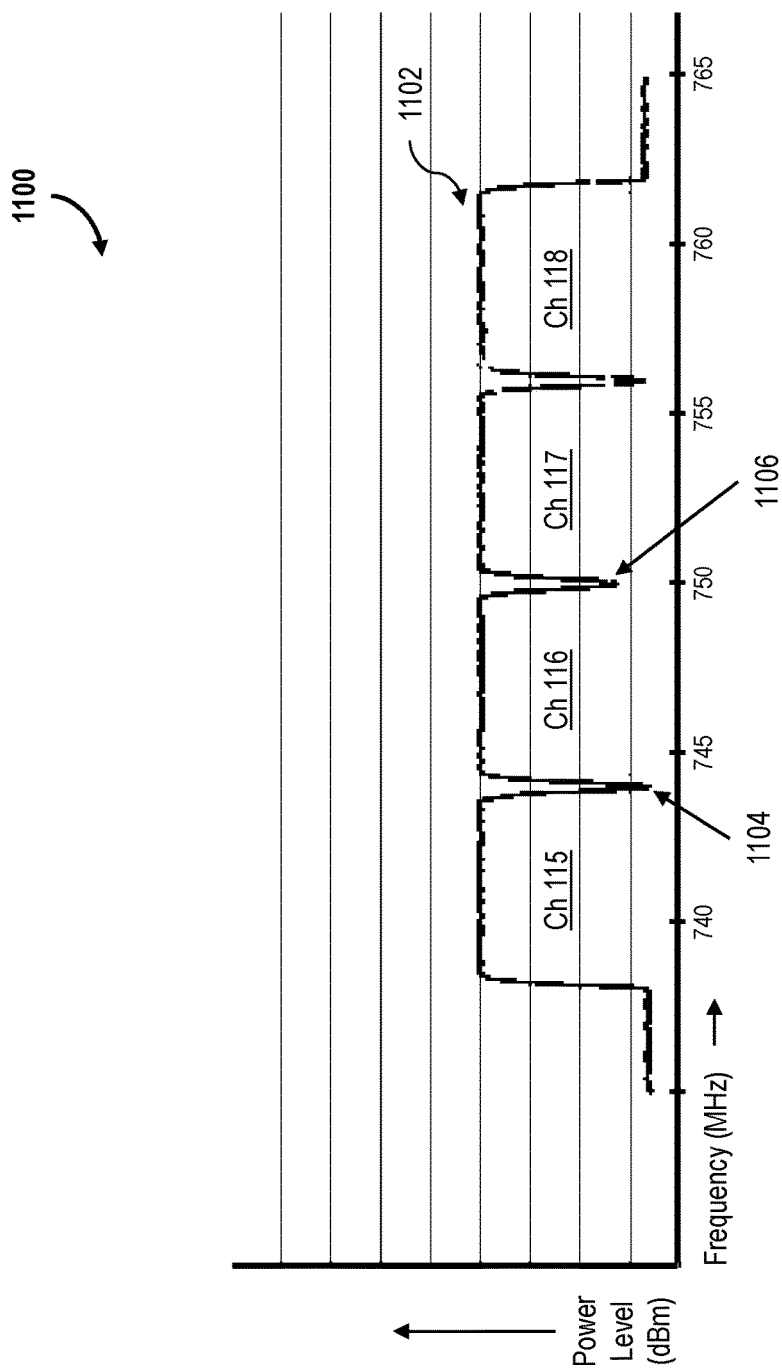
FIG. 11 is a graphical illustration depicting a channel dip effect, according to an embodiment.

FIG. 11 is a graphical illustration depicting a channel dip effect 1100 for and FBC of a spectral plot 1102 of CATV channels 115 through 118. In the exemplary embodiment illustrated in FIG. 11, the vertical axis represents an amplitude of the cable signal (in dBm), and the horizontal axis represents the spectral frequency (in MHz). Channel dip effect 1100 exhibits a first channel dip 1104 in spectral plot 1102 between channels 115 and 116, where the cable signal is not affected by the LTE ingress. Channel dip effect 1100 exhibits a second channel dip 1106 in spectral plot 1102 between channels 116 and 117, where the cable signal is affected by the LTE ingress. Channel dip effect 1100 thus demonstrates that the respective channel dips 1104 and 1106 are different depending on whether or not an LTE ingress is present. That is, second channel dip 1106 confirms the LTE signature.

Utilization of channel dip effect 1100 and the FBC MIB may be of particular use in the case where the MER MIB cannot be reliably mapped to the actual MER, or in the case where it is difficult to clearly identify the MER signature at low LTE power. Alternatively, the FBC MIB may be implemented to confirm the LTE signature even in the case where the MER MIB signature is determined. In the exemplary embodiment, the linear average of 100 FBCs or more is taken to smooth out the display of spectral plot 1102, and to render the spectrum more repeatable. Also in the exemplary embodiment, the FBC averaging MIB is implemented by the CM, which is not conventionally enabled by many CM manufacturers.

Figure 12:
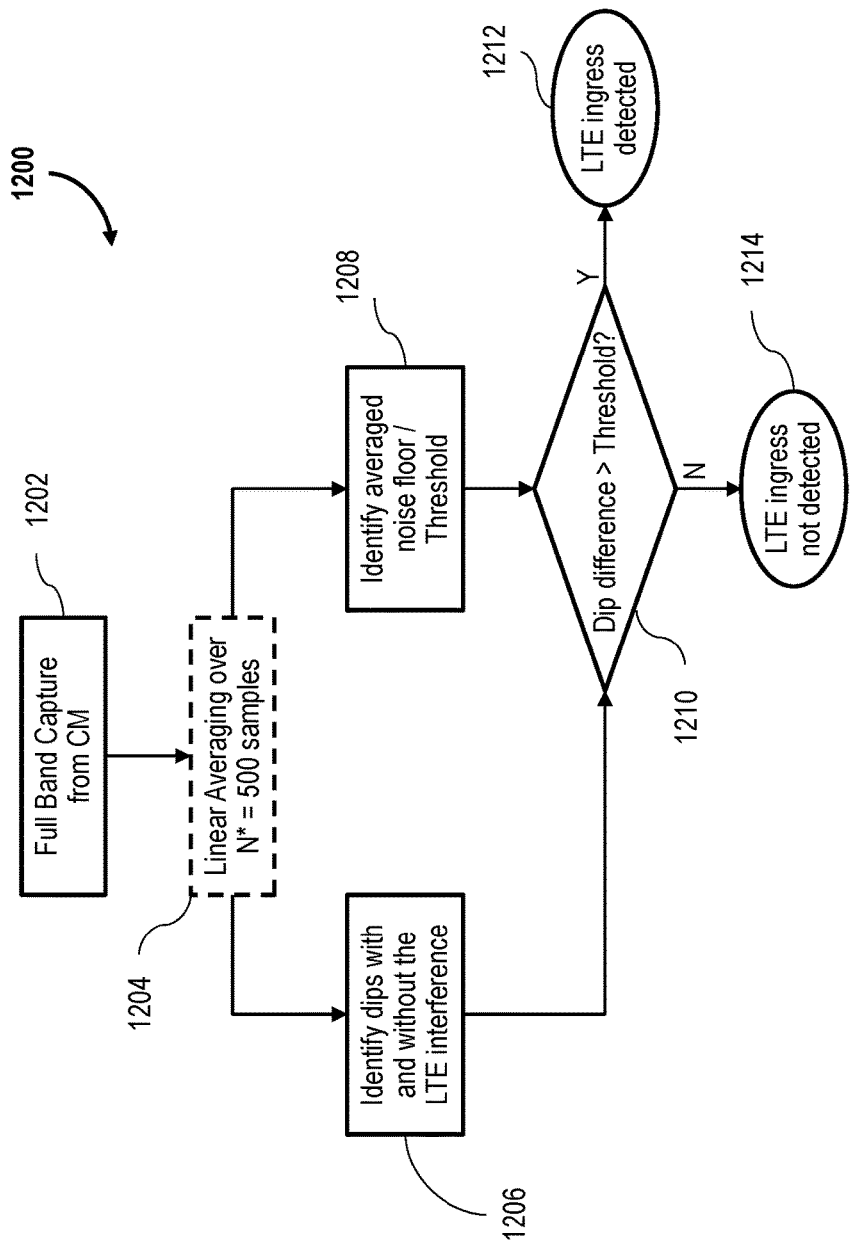
FIG. 12 is a flow chart diagram of an exemplary ingress detection process utilizing full band capture, according to an embodiment.

FIG. 12 is a flow chart diagram of an exemplary ingress detection process 1200 utilizing full band capture. In the exemplary embodiment, process 1200 is executed by the CM processor, such as by computer executable instructions contained therein. In alternative embodiments, process 1200 may be executed by the CMTS processor, and/or by a separate dedicated hardware unit.

In exemplary operation, process 1200 begins at step 1202. In step 1202, process 1200 performs a full band capture of the signal spectrum received, for example, by the CM. Step 1204 is an optional step. In step 1204, process 1200 performs linear averaging of a plurality of FBCs obtained in step 1202. In an exemplary embodiment of step 1204, process 1204 performs linear averaging with respect to at least 500 FBC samples. In this example, the chosen number of 500 FBC samples corresponds to a limitation of a 95% confidence interval to 1 dB, and where the standard deviation for the level of dips is in the order of approximately 5 dB.

In step 1206, process 1200 identifies the respective channel dips in the FBC between cable channels having LTE interference (e.g., between channels 116 and 117) and between cable channels without LTE interference (e.g., between channels 115 and 116). In step 1208, process 1200 calculates the average noise floor of the FBC, and determines the FBC threshold value therefrom. In some embodiments, steps 1206 and 1208 may be performed simultaneously, or the opposite order.

Step 1210 is a decision step. In step 1210, process 1200 determines whether the difference between the respective channel dips in the FBC exceeds the FBC threshold value determined in step 1208. If, in step 1210, process 1200 determines that the channel dip difference is greater than the FBC threshold value, process 1200 proceeds to step 1212, where process 1200 determines that an LTE ingress is detected. If, however, in step 1210, process 1200 determines that the channel dip difference is not greater than the FBC threshold value, process 1200 proceeds to step 1214, where process 1200 determines that an LTE ingress is not detected.

Table 6, below, represents the difference of two dips in the frequency domain, in the case where the CM operates in a high power condition (Case 1). Table 7, below, represents the difference in amplitude levels of the two dips in the frequency domain in the case where the CM operates in low power condition (Case 2). In both cases, the measured amplitude difference of the two dips exhibits low standard deviation across the various different trials, and is therefore considered repeatable. As described above, the FBC is a particularly valuable MIB metric in the case where the MER MIB may not be reliably mapped to the actual MER, or in the case where additional verification of the LTE signature is desired.

TABLE 6

Case 1 (CM Power = 12 dBmV)
Full Band Capture

| LTE signal power | Measured difference of two dips (dB) Trial1 | Measured difference of two dips (dB) Trial2 | Measured difference of two dips (dB) Trial3 | Measured difference of two dips (dB) Trial4 | Measured difference of two dips (dB) Trial5 | Standard deviation | Mean difference of two dips (dB) | LTE signal power |
|---|---|---|---|---|---|---|---|---|
| −38 dB | 1.4 | 1.4 | 1.7 | 1.5 | 1.3 | 0.15 (10.2%) | 1.46 | −38 dB |
| −35 dB | 2.1 | 2.5 | 2.3 | 2.5 | 2.3 | 0.17 (7.2%) | 2.34 | −35 dB |
| −33 dB | 3.0 | 3.4 | 3.6 | 3.3 | 3.4 | 0.22 (6.6%) | 3.34 | −33 dB |
| −30 dB | 5.3 | 5.4 | 5.0 | 4.9 | 5.3 | 0.21 (4%) | 5.18 | −30 dB |
| −27 dB | 7.4 | 7.5 | 7.05 | 7.45 | 7.3 | 0.17 (2.3%) | 7.34 | −27 dB |

TABLE 7

Case 2 (CM Power = 0 dBmV)
Full Band Capture

| LTE signal power | Measured difference of two dips (dB) Trial1 | Measured difference of two dips (dB) Trial2 | Measured difference of two dips (dB) Trial3 | Measured difference of two dips (dB) Trial4 | Measured difference of two dips (dB) Trial5 | Standard deviation | Mean difference of two dips (dB) | LTE signal power |
|---|---|---|---|---|---|---|---|---|
| −38 dB | 1.4 | 1.39 | 1.56 | 1.27 | 1.23 | .13 | 1.37 | −38 dB |
| −35 dB | 2.17 | 1.96 | 1.98 | 2.08 | 2.17 | 0.1 | 2.07 | −35 dB |
| −33 dB | 3.01 | 2.65 | 3.28 | 2.69 | 2.7 | 0.27 | 2.86 | −33 dB |
| −30 dB | 4.7 | 4.76 | 4.69 | 4.67 | 5.05 | .16 | 4.77 | −30 dB |
| −27 dB | 6.75 | 7.1 | 7.26 | 7.09 | 7.32 | 0.22 | 7.1 | −27 dB |

Forward Error Correction Management Information Base (FEC MIB)

In an additional exemplary embodiment, FEC is additionally, or alternatively, utilized to identify an LTE ingress. More specifically, the pre-FEC error rate and the post-FEC error rate obtained for a particular channel of the CM are useful to indicate the presence of an LTE interference in that channel. That is, the difference between the pre-/post-FEC error rate of the CM for a cable channel with (e.g., channels 116 or 117) and without (e.g., channels 115 or 118) LTE overlap/interference may also be used as a signature to identify the LTE ingress. In this example, where the SNR is high, the channel having no LTE overlap (e.g., channels 115 or 118) it is expected to exhibit a pre-/post-FEC error rate of zero. In comparison with the MER MIB and the FBC MIB, described above, the FEC MIB of this embodiment is of greater utility in the case where an LTE is to be identified within a more limited SNR range.

Table 8, below, represents the measured pre-FEC error rates for the five respective LTE signal power levels in Case 1. For Case 1, the post-FEC error rate is 0.33 at −27 dB (i.e., the highest power level of the five separate trials), and the post-FEC error rate is 0 for other all other trials at the lower LTE signal strengths.

Table 9, below, represents the measured pre-FEC error rates for the same five trials at the respective LTE signal power levels, but for Case 2. For Case 2, the post-FEC error rate is 0.06 at −27 dB (the highest power level of the five trials), and 0 for all other trials at the lower LTE signal strengths that were tested considered. In this example, the pre-FEC error rate is demonstrated to be more useful as a LTE ingress indicator criterion in the case where the SNR is in the relatively low region (e.g., approximately 33 dB), as opposed to regions having a relatively higher SNR.

As demonstrated in Tables 8 and 9, for both Cases 1 and 2, the pre-FEC error rate exhibits a relatively lower repeatability as compared to other the MER MIB and the FBC MIB, described above.

Figure 13:
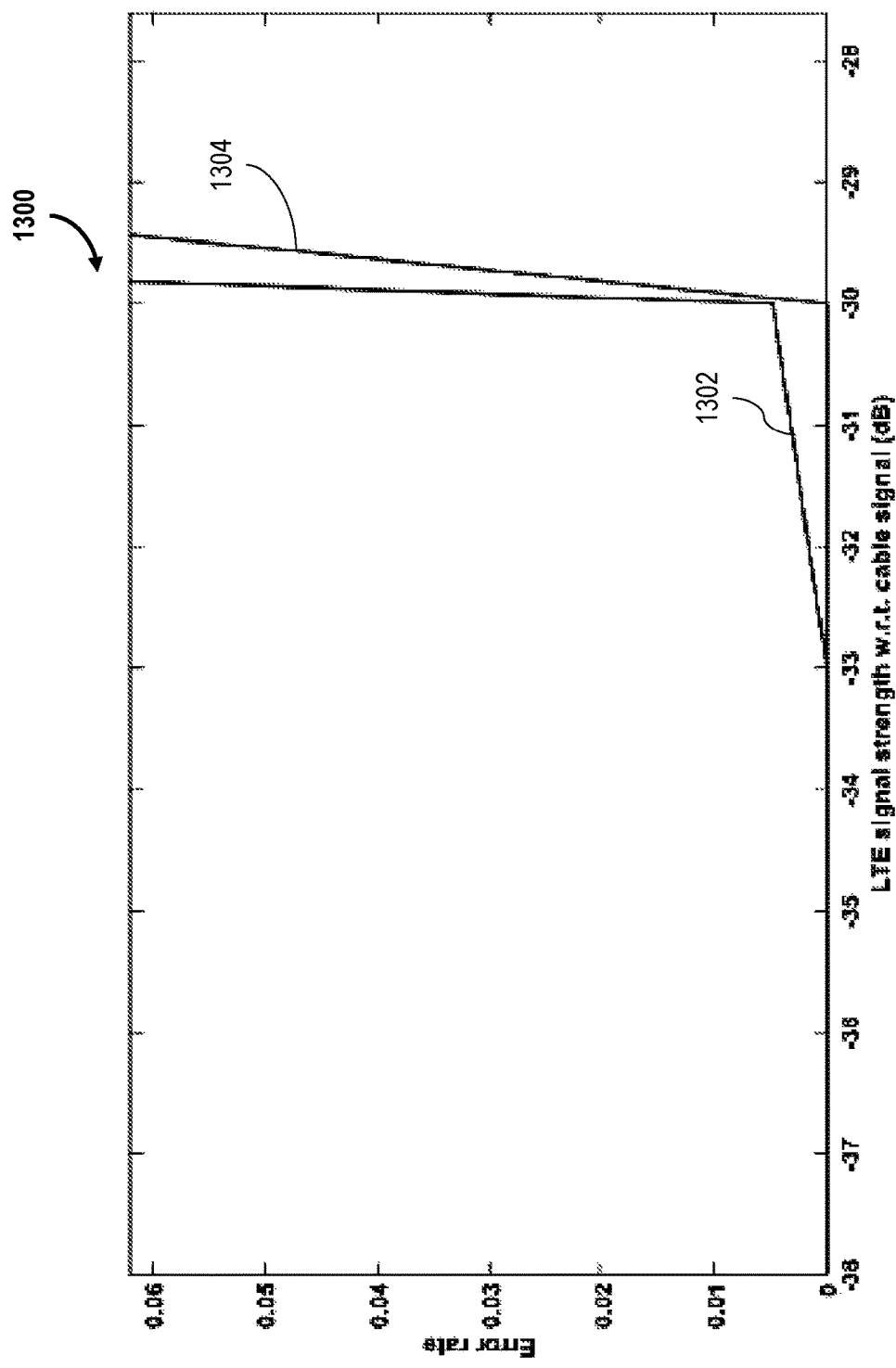
FIG. 13 is a graphical illustration depicting a forward error correction error rate effect, according to an embodiment.

FIG. 13 is a graphical illustration depicting in FEC error rate effect 1300. FEC error rate effect 1300 is depicted to illustrate the magnitude (vertical axis) of a pre-FEC error rate 1302 and a post-FEC error rate 1304 against the LTE signal strength with respect to the cable signal (horizontal axis, in dB). In the exemplary embodiment, post-FEC error rate 1304 is a step function with respect to MER, and non-zero at an LTE signal strengths of −27 dB. As illustrated in FIG. 13, the pre-FEC error rate thus represents a better indicator of medium- and low-LTE signal strengths in comparison with the post-FEC error rate.

Energy Detection (ED) Using FBC

In some conventional techniques, energy detection (ED) is utilized in cognitive radios to determine whether or not a channel is empty. In an exemplary embodiment, the systems and methods herein adaptively utilize ED techniques as an alternative, or a supplement, to the FBC MIB embodiments described above. Examples of the present ED FBC embodiments are described below with respect to FIGS. 14 and 15.

Figure 14:
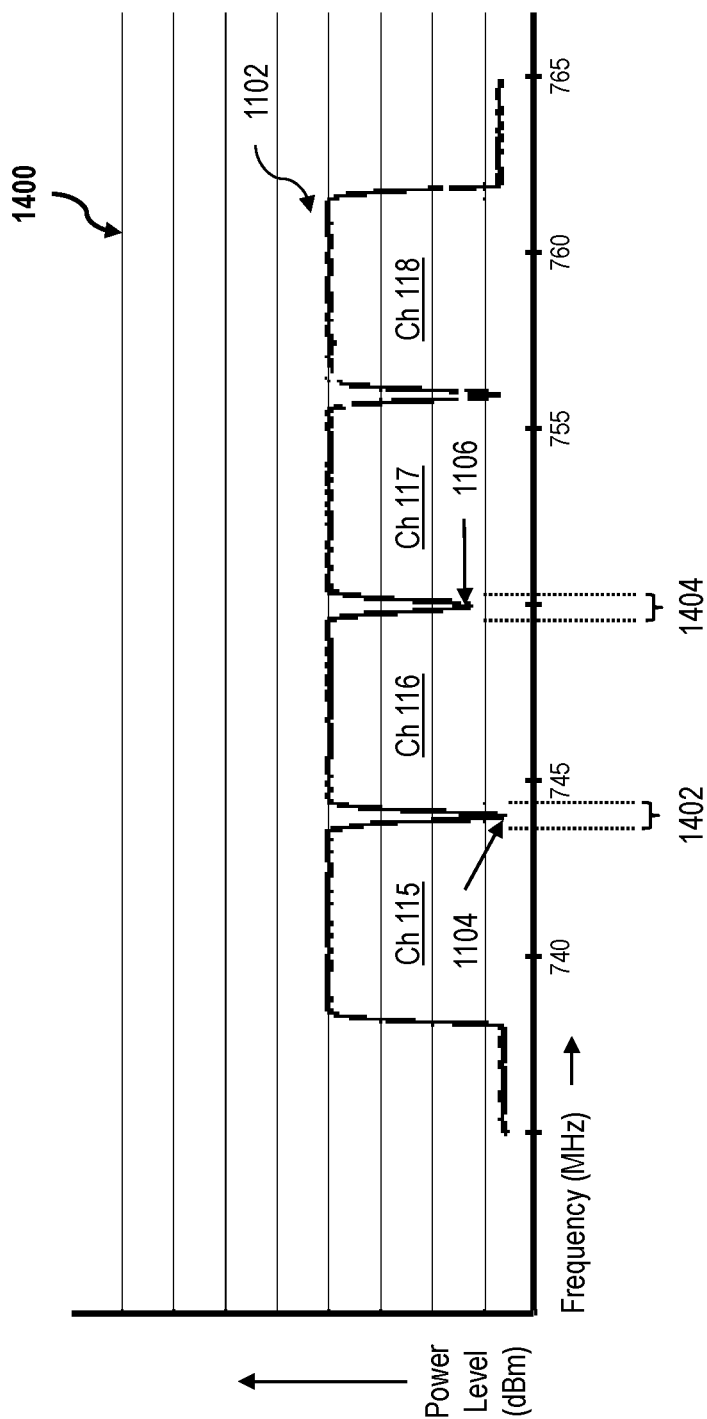
FIG. 14 is a graphical illustration demonstrating an energy detection effect on the frequency spectrum depicted in FIG. 11, according to an embodiment.

FIG. 14 is a graphical illustration demonstrating an energy detection effect 1400 on frequency spectrum 1102, FIG. 11. In the exemplary embodiment, in contrast to channel dip effect 1100, FIG. 11, instead of sampling the minimum (i.e., the dip) point in the FBC of spectrum 1102, energy detection effect 1400 alternatively detects the energy in a relatively small (e.g., 50 kHz, constituting nine samples in a 2048-point FFT) first section 1402 of spectrum 1102 surrounding first channel dip 1104, and in a similarly small second section 1404 of spectrum 1102 surrounding second channel dip 1106. In this embodiment, the sum of detected power in second section 1404, i.e., corresponding to the presence of LTE interference, is greater than the sum of the detected power in first section 1402, where there is no LTE signal overlap.

Figure 15:
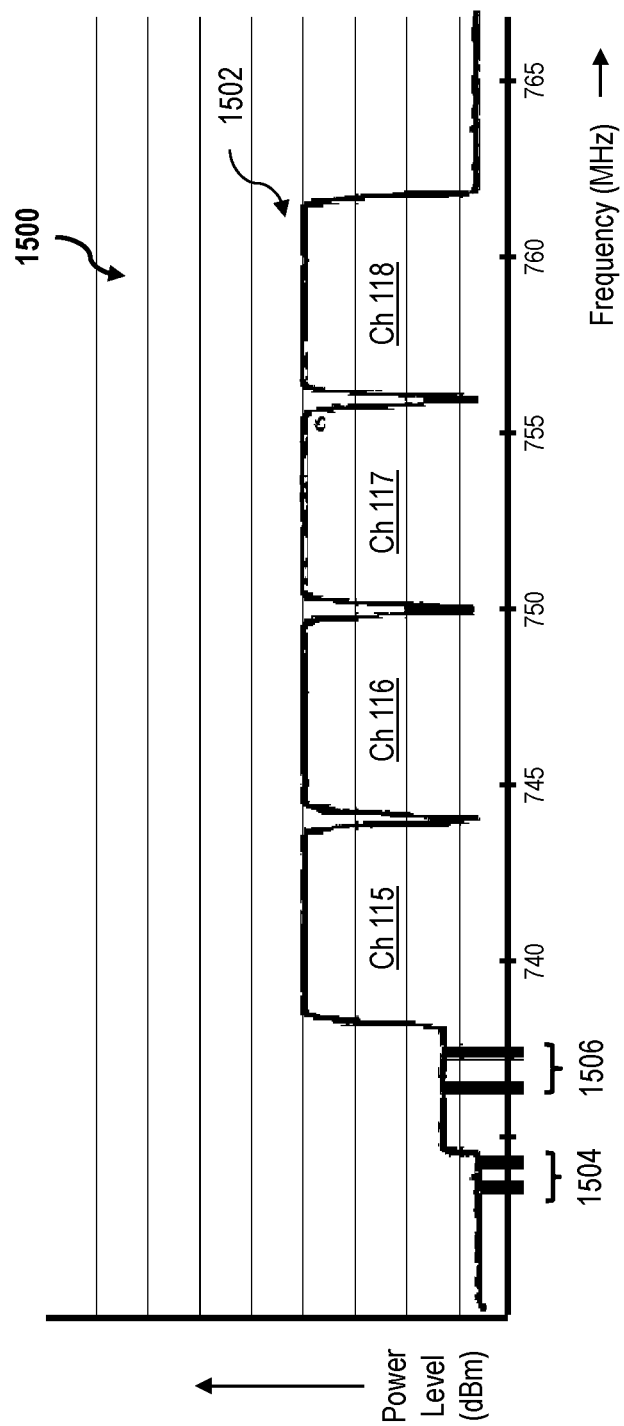
FIG. 15 is a graphical illustration demonstrating an energy detection effect on an alternative frequency spectrum, according to an embodiment.

FIG. 15 is a graphical illustration demonstrating an energy detection effect 1500 on an alternative frequency spectrum

TABLE 8

Case 1 (CM Power = 12 dBmV)
FEC

| LTE signal power | Measured Pre-FEC error rate Trial1 | Measured Pre-FEC error rate Trial2 | Measured Pre-FEC error rate Trial3 | Measured Pre-FEC error rate Trial4 | Measured Pre-FEC error rate Trial5 | Standard deviation | Mean Pre-FEC error rate (dB) |
|---|---|---|---|---|---|---|---|
| −38 dB | 0 | 0 | 0 | 0 | 0 | 0 | 0 |
| −35 dB | $2.4 * 10^{-7}$ | $4.4 * 10^{-7}$ | $3.9 * 10^{-7}$ | $3.9 * 10^{-7}$ | $6.6 * 10^{-7}$ | $1.5 * 10^{-7}$ (35%) | $4.24 * 10^{-7}$ |
| −33 dB | $1.5 * 10^{-5}$ | $1.4 * 10^{-5}$ | $1.6 * 10^{-5}$ | $1.7 * 10^{-5}$ | $1.7 * 10^{-5}$ | $1.3 * 10^{-6}$ (8.2%) | $1.58 * 10^{-5}$ |
| −30 dB | $4.9 * 10^{-3}$ | $4.9 * 10^{-3}$ | $4.8 * 10^{-3}$ | $4.8 * 10^{-3}$ | $4.8 * 10^{-3}$ | $0.05 * 10^{-3}$ (1%) | $4.8 * 10^{-3}$ |
| −27 dB | 0.96 | 0.95 | 0.95 | 0.95 | 0.95 | 0.005 (0.5%) | 0.95 |

TABLE 9

Case 2 (CM Power = 0 dBmV)
FEC

| LTE signal power | Measured Pre-FEC error rate Trial1 | Measured Pre-FEC error rate Trial2 | Measured Pre-FEC error rate Trial3 | Measured Pre-FEC error rate Trial4 | Measured Pre-FEC error rate Trial5 | Standard deviation | Mean Pre-FEC error rate (dB) |
|---|---|---|---|---|---|---|---|
| −38 dB | 0 | 0 | 0 | 0 | 0 | 0 | 0 |
| −35 dB | $9.7 * 10^{-8}$ | $2.9 * 10^{-7}$ | $2.9 * 10^{-7}$ | $9.7 * 10^{-8}$ | $3.6 * 10^{-7}$ | $1.2 * 10^{-7}$ | $2.26 * 10^{-7}$ |
| −33 dB | $6.1 * 10^{-6}$ | $7.8 * 10^{-6}$ | $7.6 * 10^{-6}$ | $8.7 * 10^{-6}$ | $9.7 * 10^{-6}$ | $1.34 * 10^{-6}$ | $7.98 * 10^{-6}$ |
| −30 dB | $2.2 * 10^{-3}$ | $2.09 * 10^{-3}$ | $2.1 * 10^{-3}$ | $2.16 * 10^{-3}$ | $2.3 * 10^{-3}$ | $8.5 * 10^{-5}$ | $2.2 * 10^{-3}$ |
| −27 dB | 0.79 | 0.78 | 0.79 | 0.78 | 0.79 | 0.005 | 0.78 |

1502. Energy detection effect 1500 is similar to energy detection effect 1400, FIG. 14, except that alternative frequency spectrum 1502 represents an FBC where the LTE signal interferes in a partially QAM-absent channel. Accordingly, energy detection effect 1500 detects the energy in a first section 1504 corresponding to an empty channel, and in a second section 1506 corresponding to a partially absent channel.

Figure 16:
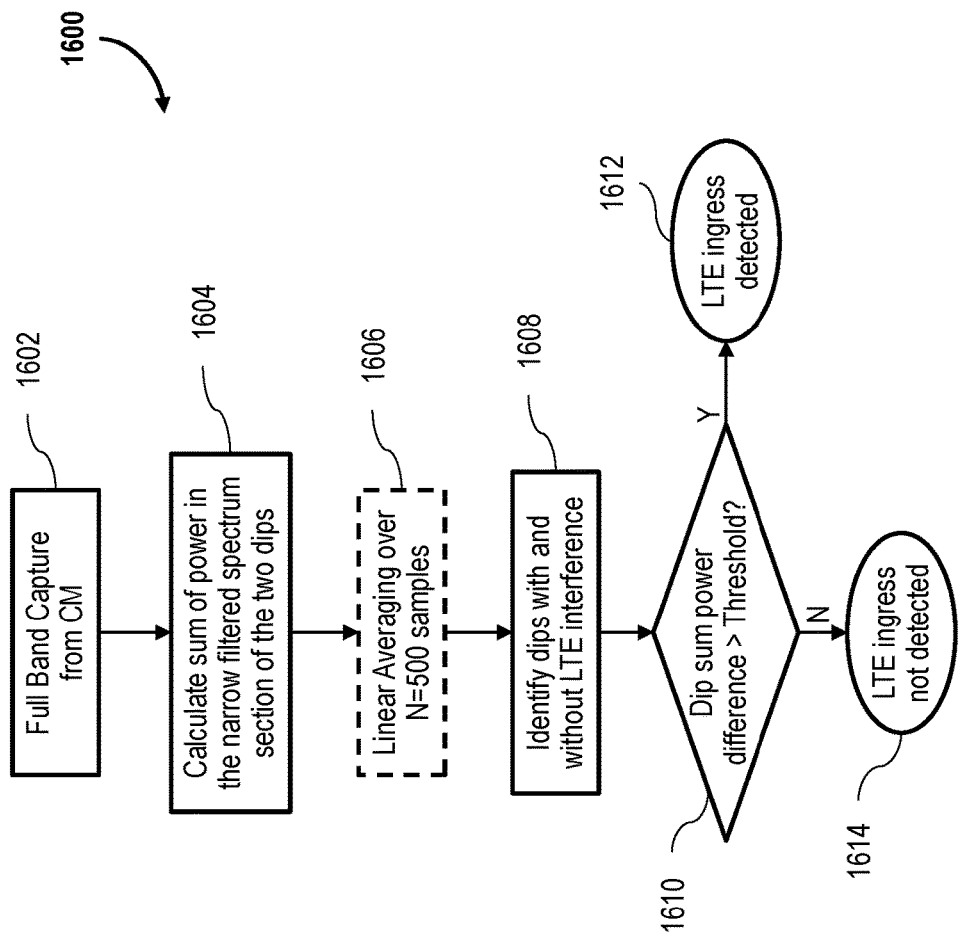
FIG. 16 is a flow chart diagram of an exemplary ingress detection process utilizing energy detection, according to an embodiment.

FIG. 16 is a flow chart diagram of an exemplary ingress detection process 1600 utilizing energy detection (ED). In the exemplary embodiment, process 1600 is similar to process 1200, FIG. 12, and executed by the CM processor. Alternatively, process 1600 may be executed by the CMTS processor and/or by a separate dedicated hardware unit.

In exemplary operation, process 1600 begins at step 1602. In step 1602, process 1600 performs a full band capture of the signal spectrum received, for example, by the CM. In step 1604, process 1600 calculates the sum of power in each of the narrow filtered sections of the FBC (e.g., first section 1402 and second section 1404, FIG. 14, or first section 1504 and second section 1506, FIG. 15). Step 1606 is an optional step. In step 1606, process 1600 performs linear averaging of a plurality of FBCs obtained in step 1602 (e.g., 500 FBC samples). In step 1608, process 1600 identifies the respective channel dips, according to the detected energy of the samples therein, having LTE interference without LTE interference. Step 1610 is a decision step. In step 1610, process 1600 determines whether the difference between the summed power of the respective channel dips exceeds an FBC threshold value (e.g., step 1208, FIG. 12). If, in step 1610, process 1600 determines that the dip sum power difference is greater than the threshold value, process 1600 proceeds to step 1612, where process 1600 determines that an LTE ingress is detected. If, however, in step 1610, process 1600 determines that the dip sum power difference is not greater than the threshold value, process 1600 proceeds to step 1614, where process 1600 determines that an LTE ingress is not detected.

Table 10, below, represents the measured ED difference between two dips for each of the five trials and five LTE signal power levels described above. As demonstrated in Table 10, this particular LTE detection technique exhibits a low standard deviation, and therefore a high repeatability. As compared with the FBC MIB embodiments described above, the addition of ED to the FBC represents a more reliable LTE detection technique because the ED FBC additionally considers the sum of power for an entire narrow filtered section of the spectrum, rather than just the power at the specific dip point.

Figure 17:
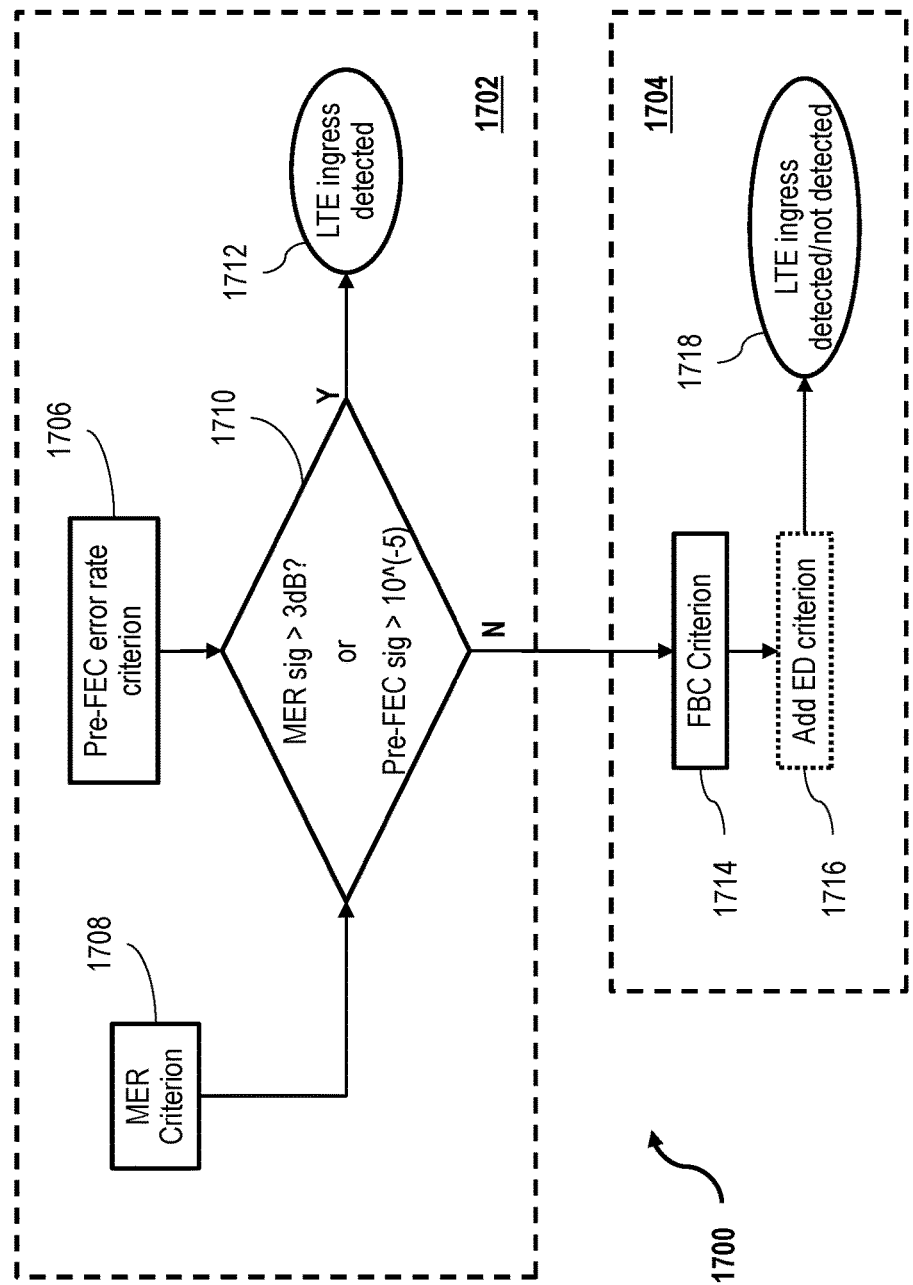
FIG. 17 is a flow chart diagram of an exemplary LTE detection process, according to an embodiment.

FIG. 17 is a flow chart diagram of an exemplary LTE detection process 1700. In the exemplary embodiment, process 1700 is executed by the CM or CMTS processor, and includes an algorithm to implement one or more of the several LTE detection and characterization techniques described above.

In exemplary operation, process 1700 includes a first subprocess 1702 and a second subprocess 1704. In the exemplary embodiment, first subprocess 1702 utilizes MER and/or pre-FEC metrics to identify the presence of an LTE signal, and second subprocess 1704 utilizes FBC and/or FBC-plus-ED criterion in a more refined approach to identify the presence of an LTE signal in the case where the FBC signature is less than 1.5 dB. Process 1700 begins with first subprocess 1702 at step 1706. In step 1706, process 1700 obtains the pre-FEC criteria described above with respect to the FEC MIB embodiments. Alternatively, process 1700 and first subprocess 1702 begin at step 1708, in which process 1700 obtains the MER criteria described above with respect to the MER MIB embodiments. In some embodiments, process 1700 executes both steps 1706 and 1708, which may be performed simultaneously, or in the opposite order.

Step 1710 is a decision step. In step 1710, process 1700 determines whether the respective signatures of the criteria obtained in one or both of steps 1706 and 1708 exceeds a respective threshold value. In an exemplary embodiment of step 1710, process 1700 determines whether the pre-FEC signature from step 1208 is greater than 3 dB and/or whether the MER signature from step 1708 is greater than $10^{\wedge}(-5)$. If, in step 1710, process 1700 determines that either or both of these signatures is greater than the respective threshold value, process 1700 proceeds to step 1712, where process 1700 determines that an LTE ingress is detected. If, however, in step 1710, process 1700 determines that the respective signature or signatures are not greater than the threshold value, process 1700 proceeds to second subprocess 1704.

Second subprocess 1704 begins at step 1714, in which process 1700 obtains the FBC criteria described above with respect to the FBC MIB embodiments. Step 1716 is an optional step. In step 1716, process 1700 adds the ED criteria, described above with respect to the ED embodiments, to the FBC criteria obtained in step 1714. In step 1718, process 1700 determines whether an LTE ingress is detected or not detected, according to the techniques described above with respect to detection process 1200, FIG. 12, and/or detection process 1600, FIG. 16.

According to the advantageous systems and methods described herein, innovative MER, FEC, and FBC techniques are confirmed to reliably detect an LTE ingress. The

TABLE 10

ED using FBC

| LTE signal power | Measured ED difference of two dips Trial1 | Measured ED difference of two dips Trial2 | Measured ED difference of two dips Trial3 | Measured ED difference of two dips Trial4 | Measured ED difference of two dips Trial5 | Standard deviation | Mean ED difference of two dips |
|---|---|---|---|---|---|---|---|
| −38 dB | $1.47 * 10^{\wedge}(-9)$ | $1.7 * 10^{\wedge}(-9)$ | $1.3 * 10^{\wedge}(-9)$ | $1.45 * 10^{\wedge}(-9)$ | $1.63 * 10^{\wedge}(-9)$ | $.15 * 10^{\wedge}(-9)$ (9.9%) | $1.51 * 10^{\wedge}(-9)$ |
| −35 dB | $2.91 * 10^{\wedge}(-9)$ | $2.96 * 10^{\wedge}(-9)$ | $2.75 * 10^{\wedge}(-9)$ | $2.76 * 10^{\wedge}(-9)$ | $2.57 * 10^{\wedge}(-9)$ | $.15 * 10^{\wedge}(-9)$ (5.4%) | $2.8 * 10^{\wedge}(-9)$ |
| −33 dB | $4.6 * 10^{\wedge}(-9)$ | $4.55 * 10^{\wedge}(-9)$ | $4.83 * 10^{\wedge}(-9)$ | $4.58 * 10^{\wedge}(-9)$ | $4.56 * 10^{\wedge}(-9)$ | $.12 * 10^{\wedge}(-9)$ (2.6%) | $4.62 * 10^{\wedge}(-9)$ |
| −30 dB | $9.43 * 10^{\wedge}(-9)$ | $8.95 * 10^{\wedge}(-9)$ | $8.63 * 10^{\wedge}(-9)$ | $8.8 * 10^{\wedge}(-9)$ | $8.45 * 10^{\wedge}(-9)$ | $.37 * 10^{\wedge}(-9)$ (4.18%) | $8.85 * 10^{\wedge}(-9)$ |
| −27 dB | $1.79 * 10^{\wedge}(-8)$ | $1.8 * 10^{\wedge}(-8)$ | $1.81 * 10^{\wedge}(-8)$ | $1.85 * 10^{\wedge}(-8)$ | $1.78 * 10^{\wedge}(-8)$ | $.27 * 10^{\wedge}(-9)$ (1.5%) | $1.8 * 10^{\wedge}(-8)$ | present embodiments further demonstrate additional reliability with respect to FBC utilizing additional energy detection techniques. The advantageous techniques described herein still further demonstrate a novel white noise model to characterize the LTE signal power, as well as a hybrid detection process implementing several of the disclosed LTE detection techniques together in combination. In at least one embodiment, the modeled characterization of LTE signal power is of particular use to calculate a minimum distance for small cell placement.

According to the several innovative PNM MIB techniques herein, the ability of an operator to detect and characterize an LTE ingress is significantly improved in comparison with conventional detection schemes. The several techniques of the embodiments disclosed herein are further advantageous in that they may operate non-exclusively, and may be unified into a single LTE detection algorithm. The MER, FBC and ED techniques in particular demonstrate significantly improved repeatability in test results. In the examples described above, the test results are illustrated with respect to single-use cases for ease of explanation. In practice the innovative systems and methods herein are applicable to generate signatures for any frequency channel and CM. Additionally, the present embodiments enable the measurement and detection of an LTE ingress in real-time, which further enables an MSO to customize the detection scheme as desired.

Small Cell Placement Using PNM Metrics

As described above, conventional leakage in LTE detection techniques use the drive test, which is significantly resource-intensive, as are other location-based detection schemes. In contrast, the embodiments disclosed herein advantageously utilize the innovative PNM metrics detection techniques, also described above, to determined small cell placement utilizing the CM (and/or the CMTS), thereby avoiding the considerable assessment costs of the conventional techniques. The following systems and methods provide techniques for determining a minimum small cell distance, and also an algorithm for optimum small cell placement.

Figure 2:
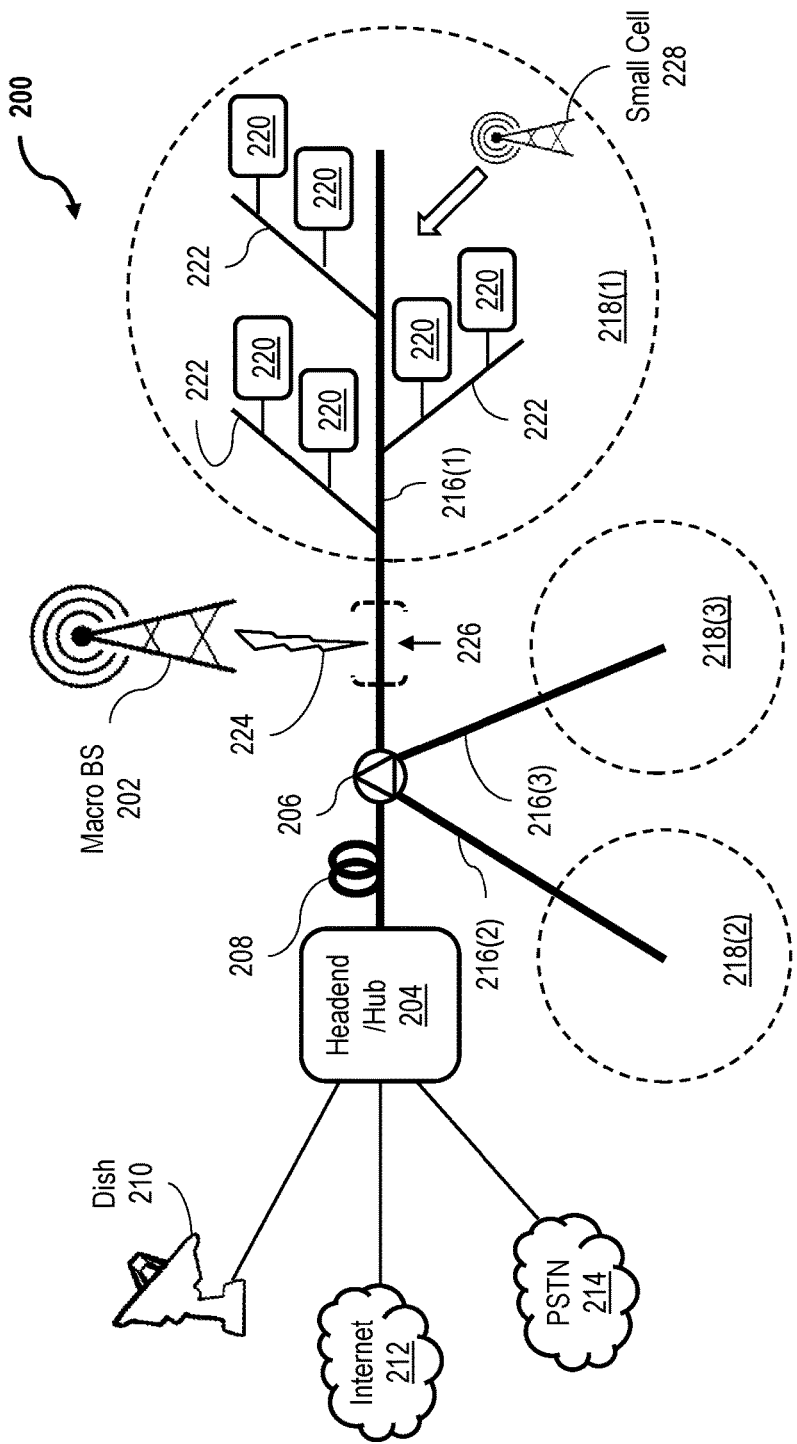
FIG. 2 is a schematic illustration depicting a conventional cable network operating within the vicinity of a macro base station.

As described above with respect to Eq. 2, the allowable MER difference, $\Delta$(dB), may be calculated to determine the noise power for the white noise model and obtain the MER signature. For similar techniques, the MER signature may be utilized to characterize LTE power in the cable. A variation on Eq. 3, above, may be represented as:

$$\Delta = 10 * \log 10(\text{Noise\_P} + \text{LTE\_P}) - 10 * \log 10(\text{Noise\_P}) \quad \text{(Eq. 5)}$$

where Noise_P represents the noise power in the plant with respect to the cable signal power, and where LTE_P represents the LTE signal power, also with respect to the cable signal power, which ingress is from the macro base station (e.g., macro base station 202, FIG. 2).

Accordingly, the LTE signal power, LTE_P, may then represented as the following variation on Eq. 4, above:

$$\text{LTE\_P(dB)} = 10 * \log 10 \left( \left( 10^{\frac{\Delta + \varepsilon + 10 * \log 10(\text{Noise\_P})}{10}} \right) - P1 \right) \quad \text{(Eq. 6)}$$

According to the advantageous techniques herein, the present systems and methods map the MER signature to the LTE signal power and perform an initial assessment of the cable plant to identify if the cable plant is fit for small cell deployment, and once so determined, the LTE signature at the CMs is analyzed both in, and surrounding, the small cell to identify the approximate location of leakage. This example as described with respect to the MER embodiments for simplicity of explanation. The techniques described herein are also applicable to the other PNM metrics techniques described above.

In the exemplary embodiment, that PNM metrics techniques described above are implemented to determine if the LTE signature is initially greater than the respective PNM signature threshold (which would indicate a significant risk), and also if the leakage point is within the coverage area of the small cell. Under such circumstances, the present techniques would determine that the selected region should not be used for small cell deployment.

If, however, the processor (e.g., of the CM) determines that the LTE signature does not exceed the respective threshold value, but that the leakage point is still within the coverage area of the proposed small cell deployment, the processor will then calculate the minimum distance of the small cell from the leakage point for safe deployment, based on approximate gains in the cable plant. These techniques are not exclusive of the conventional drive test, which may nevertheless be performed to confirm the accuracy of the significantly improved systems and methods described herein.

Small Cell Placement Minimum Distance Calculation

The LTE signal power, $P_{LTE\_Rx}$, that is received from the small cell within the coaxial cable is represented by the equation:

$$P_{LTE\_Rx} = 20 \log(\lambda) - 20 \log(4\pi D) + P_{Tx}(\text{dBm}) + G_{Tx}(\text{dBi}) + G_{Leak}(\text{dBi}) - \text{OPL(dB)} \quad \text{(Eq. 7)}$$

where $P_{Tx}$ represents the transmit power of the small cell, $G_{Tx}$ represents the transmitted antenna gain of the small cell, $G_{Leak}$ represents the antenna gain at the leakage/ingress point, D (in m) represents the distance of the small cell from the leakage point, OPL represents the outdoor penetration loss, and $\lambda$ represents the LTE signal wavelength.

The total LTE signal power, $P_{LTE\_tot}$, in the coaxial cable at the leakage point is the sum of existing LTE power (e.g., from the macro base station) and received LTE power from the small cell. The carrier to noise ratio (CNR) of the cable signal at the point of leakage is thus represented by the equation:

$$\text{CNR} = U\text{qam} - P_{LTE\_tot} \quad \text{(Eq. 8)}$$

where Uqam represents the QAM power in the cable at the leakage point. Using this information, the minimum small cell distance can be calculated as described below with respect to FIG. 18.

Figure 18:
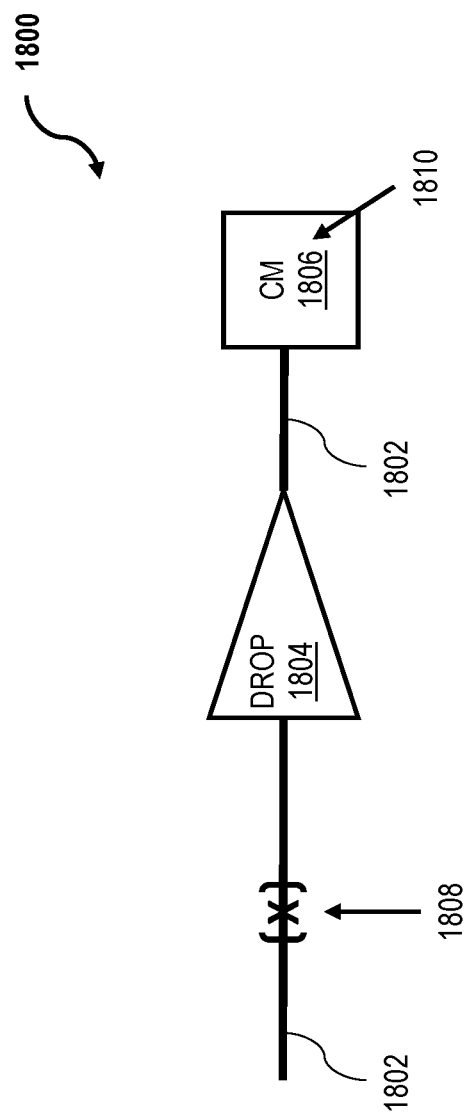
FIG. 18 is a schematic block diagram of an exemplary cable plant topology, according to an embodiment.

FIG. 18 is a schematic block diagram of an exemplary cable plant topology 1800. In the exemplary embodiment, topology 1800 includes a cable 1802, a drop 1804, and a CM 1806. The elements of topology 1800 are similar to the elements of the same name from network 200, FIG. 2, but only a portion of the overall network architecture is illustrated in FIG. 18 for ease of explanation. Also similar to network 200, above, cable 1802 includes a leakage point 1808, such as from an LTE ingress (e.g., a nearby macro base station).

In consideration of topology 1800 and using the calculations described immediately above, the existing LTE signal power without small cell deployment, $P_{LTE\_ex}$, may be estimated at the point of leakage. This estimation further utilizes an LTE signature 1810 obtained at CM 1806 using, for example, one or more of the PNM metrics techniques described above. Assuming that the drop loss (at drop 1804) is equal to K, then $P_{LTE\_ex}$ may be calculated according to the equation:

$$P_{LTE\_ex} = K * \text{LTE}_P, \quad \text{(Eq. 9)}$$

where $LTE_P$ represents estimated LTE power at CM 1806 using LTE signature 1810 (which may be determined according to Eq. 6, above).

Additionally, by utilizing the appropriate lower bound value of the CNR (determined, for example, by the MSO, and calculated according to Eq. 8, above, the minimum distance requirement of the small cell deployment from the leakage point may also be calculated.

In a first example, assuming that ΔMER=2 dB, and that the MER threshold value is 4 dB, the cable signal power at CM 1806 is 5 dBmV on channel 117, with the noise power being 33 dB below that of the cable signal. Thus, based on LTE signature 1810 (e.g., calculated using Eq. 6, above), the existing LTE power at CM 1806 is −30.32 dBmV, with the drop loss being 3 dB. Accordingly, $P_{LTE\_ex}$=−27.32 dBmV.

In a second example, assuming that the cable signal power at leakage point 1808 is 8 dBmV, and conservatively assuming a zero value for $G_{Leak}$, the minimum distance of a 5 W small cell a be calculated from leakage point 1808 such that the minimum CNR value is 32 dB. In this example, OPL is assumed to be 2 dB. The minimum distance for the small cell placement is then calculated to be 17 km for ΔMER=3 dB, 10.6 km for ΔMER=2 dB, and 8.7 km for ΔMER=1 dB.

In another example, if the detected LTE signature (obtained, for example, using the PNM metrics techniques described above) does not initially exceed the respective threshold, and if the leakage point is also determined to not be within the coverage area of the small cell, the processor of the CM (or CMTS) will determine that a chosen location for the small cell offers safe operational deployment.

Figure 19:
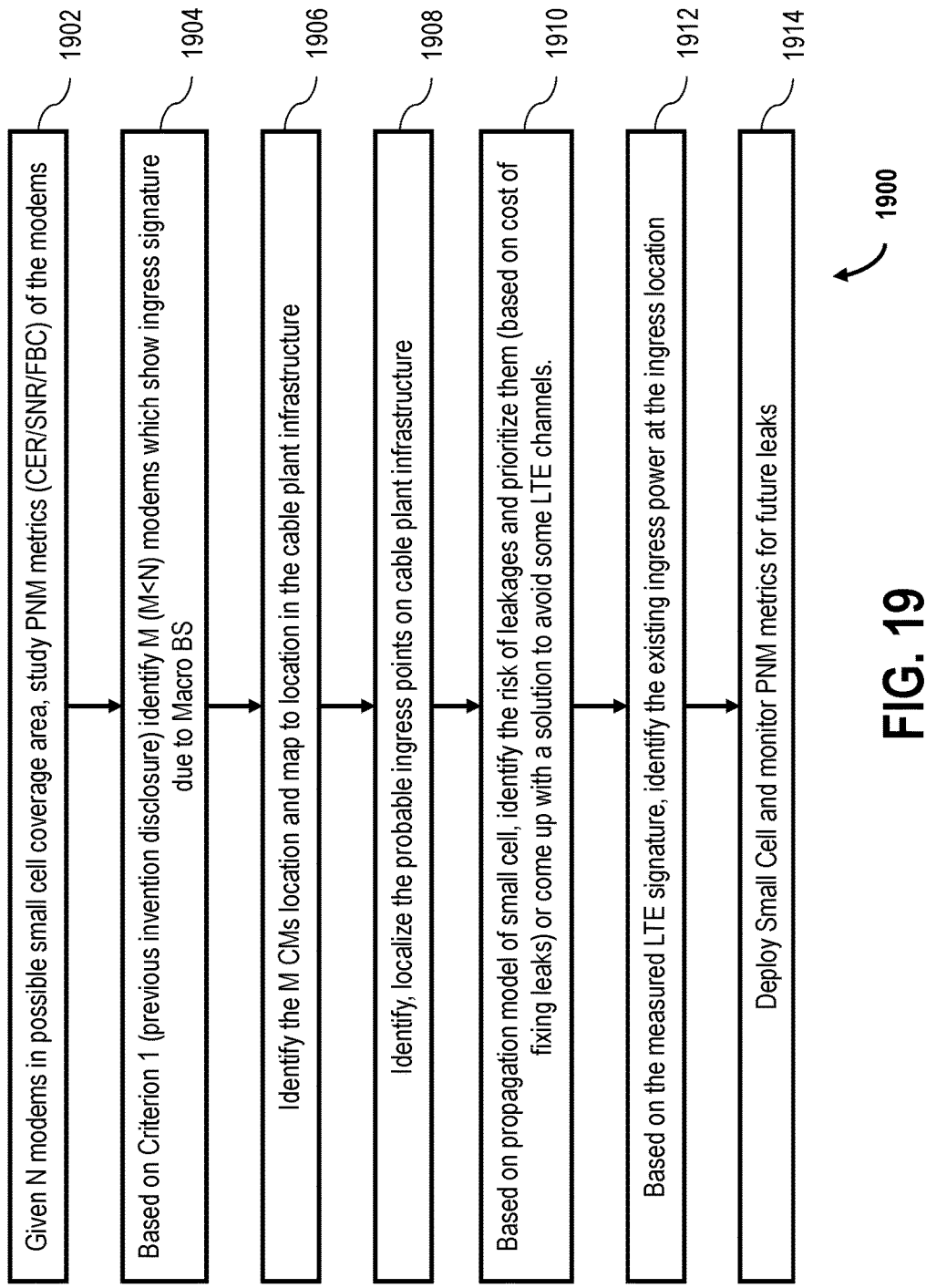
FIG. 19 is a flow chart diagram of an exemplary small cell-cable plant assessment process, according to an embodiment.

FIG. 19 is a flow chart diagram of an exemplary small cell-cable plant assessment process 1900. In the exemplary embodiment, process 1900 is executed by the CM processor. Alternatively, process 1600 may be executed by the CMTS processor and/or by a separate dedicated hardware unit.

In exemplary operation, process 1900 begins at step 1902. In step 1902, process 1900 obtains, for each of a number N CMs within the potential small cell coverage area, one or more PNM metrics (e.g., CER, FEC, SNR, FBC, MER, ED, etc.) of the particular CM, according to the PNM techniques described above. In step 1904, using the PNM metrics obtained in step 1902, process 1900 identifies a number M of the CMs which exhibit an ingress signature (e.g., from the macro base station interference at the leakage point). In the exemplary embodiment, M<N. In step 1906, process 1900 identifies the respective locations of the M CMs and maps the identified locations in the cable plant infrastructure. In step 1908, process 1900 utilizes the mapping generated in step 1906 to identify and localize the likely ingress points of the interference on the cable plant infrastructure.

In step 1910, process 1900 utilizes the measured LTE signature to calculate the existing ingress power at the ingress location. In step 1912, process 1900 uses a propagation model of the small cell to identify leakage risks among the cable plant infrastructure, and prioritize the identified risks. In an exemplary embodiment of step 1912, process 1900 prioritizes the leakage risks according to the cost to mitigate or repair the leaks. In another embodiment of step 1912, process 1900 prioritizes the leakage risks according to severity. In at least one embodiment of step 1912, process 1900 generates a solution to avoid one or more particular LTE channels presenting a significant leakage at risk (e.g., above a particular threshold value). In step 1914, process 1900 deploys the small cell base station at a selected location and calculated optimum distance from a potential leak, if any. In an exemplary embodiment of step 1914, process 1900 continues to monitor the PNM metrics, obtained in step 1902, for future or growing leaks/interferences/ingresses.

Exemplary embodiments of LTE detection and characterization systems and methods are described above in detail, as well as exemplary systems and methods for optimizing small cell placement in consideration of LTE ingress. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A communication device in a communication network having at least one cable plant within an operational vicinity of a macro base station wirelessly transmitting a long term evolution (LTE) signal, the communication device comprising at least one processor configured to:
   obtain at least one proactive network maintenance (PNM) metric for a cable signal communicated over the at least one cable plant;
   detect, at the communication device, a signature of the LTE signal based on the obtained PNM metric;
   estimate, based on the detected LTE signature, an existing LTE signal power at a point of leakage in the at least one cable plant;
   determine a carrier to noise ratio (CNR) of the at least one cable plant at the point of leakage based on a power of the cable signal and the estimated LTE signal power; and calculate a minimum safe distance from the point of leakage in which a small cell base station operates without substantial interference from the LTE signal of the macro base station.

2. The device of claim 1, wherein the communication device comprises a cable modem.

3. The device of claim 1, wherein the communication device comprises a cable modem termination system.

4. The device of claim 1, wherein the PNM metric comprises one or more of a modulation error ratio measurement, a codeword error rate calculation, a forward error correction calculation, a signal to noise ratio measurement, a full band capture measurement, and an energy detection measurement.

5. The device of claim 1, wherein the processor is further configured estimate the LTE signal power based on a loss from a drop along the at least one cable plant.

6. The device of claim 5, wherein the processor is further configured to determine the CNR using a predetermined lower bound value.

7. A method for determining a small cell base station placement in a communication network operating within the vicinity of a macro base station wirelessly transmitting a long term evolution (LTE) signal, the method comprising the steps of:
obtaining one proactive network maintenance (PNM) metric for each of a plurality of cable modems disposed within the coverage area of the small cell base station;
identifying, from the obtained PNM metrics, a selected number of the plurality of cable modems exhibiting an ingress signature of the LTE signal;
mapping respective locations of the identified selected number of cable modems;
determining, from the mapped respective locations, likely ingress points of interference from the LTE signal along a cable plant infrastructure of the communication network; and
calculating a minimum safe operating distance, from at least one of the determined likely ingress points, for the small cell base station.

8. The method of claim 7, wherein the PNM metric comprises one or more of a modulation error ratio measurement, a codeword error rate calculation, a forward error correction calculation, a signal to noise ratio measurement, a full band capture measurement, and an energy detection measurement.

9. The method of claim 7, wherein a number of the plurality of cable modems is greater than the selected number of cable modems exhibiting the ingress signature.

10. The method of claim 7, wherein the step of determining further comprises generating a propagation model of the small cell base station.

11. The method of claim 10, further comprising a step of prioritizing the likely ingress points according to the mapped respective locations and the propagation model.

12. The method of claim 11, wherein the step of prioritizing is based on the respective costs of mitigating the likely ingress points.

13. The method of claim 11, wherein the step of prioritizing is based on the respective severity of the detected interference at the likely ingress points.

14. The method of claim 11, wherein the step of prioritizing includes solution to avoid at least one ingressing LTE signal band.

15. The method of claim 7, further comprising a step of calculating a received LTE signal power, $P_{LTE\_Rx}$, according to the equation:

$$P_{LTE\_Rx} = 20\log(\lambda) - 20\log(4\pi D) + P_{Tx} + G_{Tx} + G_{Leak} - OPL$$

where $P_{Tx}$ represents a transmit power of the small cell base station, $G_{Tx}$ represents a transmitted antenna gain of the small cell base station, $G_{Leak}$ represents an antenna gain at the point of leakage, D represents the distance of the small cell base station from the point of leakage, OPL represents an outdoor penetration loss, and $\lambda$ represents a wavelength of the LTE signal.

* * * * *